US009152182B1

(12) United States Patent
McMahon et al.

(10) Patent No.: US 9,152,182 B1
(45) Date of Patent: Oct. 6, 2015

(54) RECONFIGURABLE MASS DATA RECORDING METHOD AND SYSTEM

(75) Inventors: Shean Thomas McMahon, Seal Beach, CA (US); Robert Anthony Kunc, Rancho Palos Verdes, CA (US); Kang Lee, Woodland Hills, CA (US); Vladimir Esterkin, Redondo Beach, CA (US); Ranjit Pradhan, Torrance, CA (US); Xiwen Wang, Hacienda Heights, CA (US); Frank T. Willis, Jr., Rio Rancho, NM (US); Andrew Kostrzewski, Garden Grove, CA (US); Sookwang Ro, Glendale, CA (US); Thomas Forrester, Hacienda Heights, CA (US); Tomasz Jannson, Torrence, CA (US); Michael Alan Thompson, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 675 days.

(21) Appl. No.: 13/440,897

(22) Filed: Apr. 5, 2012

Related U.S. Application Data

(60) Provisional application No. 61/476,201, filed on Apr. 15, 2011.

(51) Int. Cl.
*G06F 13/00* (2006.01)
*G06F 13/28* (2006.01)
*G06F 1/16* (2006.01)
*G06F 13/40* (2006.01)

(52) U.S. Cl.
CPC ............ *G06F 1/1658* (2013.01); *G06F 13/409* (2013.01)

(58) Field of Classification Search
None
See application file for complete search history.

(56) References Cited

U.S. PATENT DOCUMENTS

| 2008/0104642 | A1* | 5/2008 | Galipeau et al. | 725/76 |
| 2011/0320690 | A1* | 12/2011 | Petersen et al. | 711/103 |
| 2012/0192225 | A1* | 7/2012 | Harwell et al. | 725/34 |

* cited by examiner

*Primary Examiner* — Eric S Cardwell
(74) *Attorney, Agent, or Firm* — Sheppard Mullin Richter & Hampton LLP

(57) ABSTRACT

Embodiments of the invention provide a removable memory unit (RMU) that facilitates concatenation of said memory modules irrespective of their individual physical interfaces, enables encryption/decryption keys (including cryptographic ignition keys (CIKs)) to reside onboard the RMU, provides for physical separation of RED and BLACK data in cross-domain environments and implements zeroization functionality onboard the RMU. Further embodiments provide a swappable IO backplane and adapter plates for incorporation into a wide variety of platforms.

18 Claims, 24 Drawing Sheets

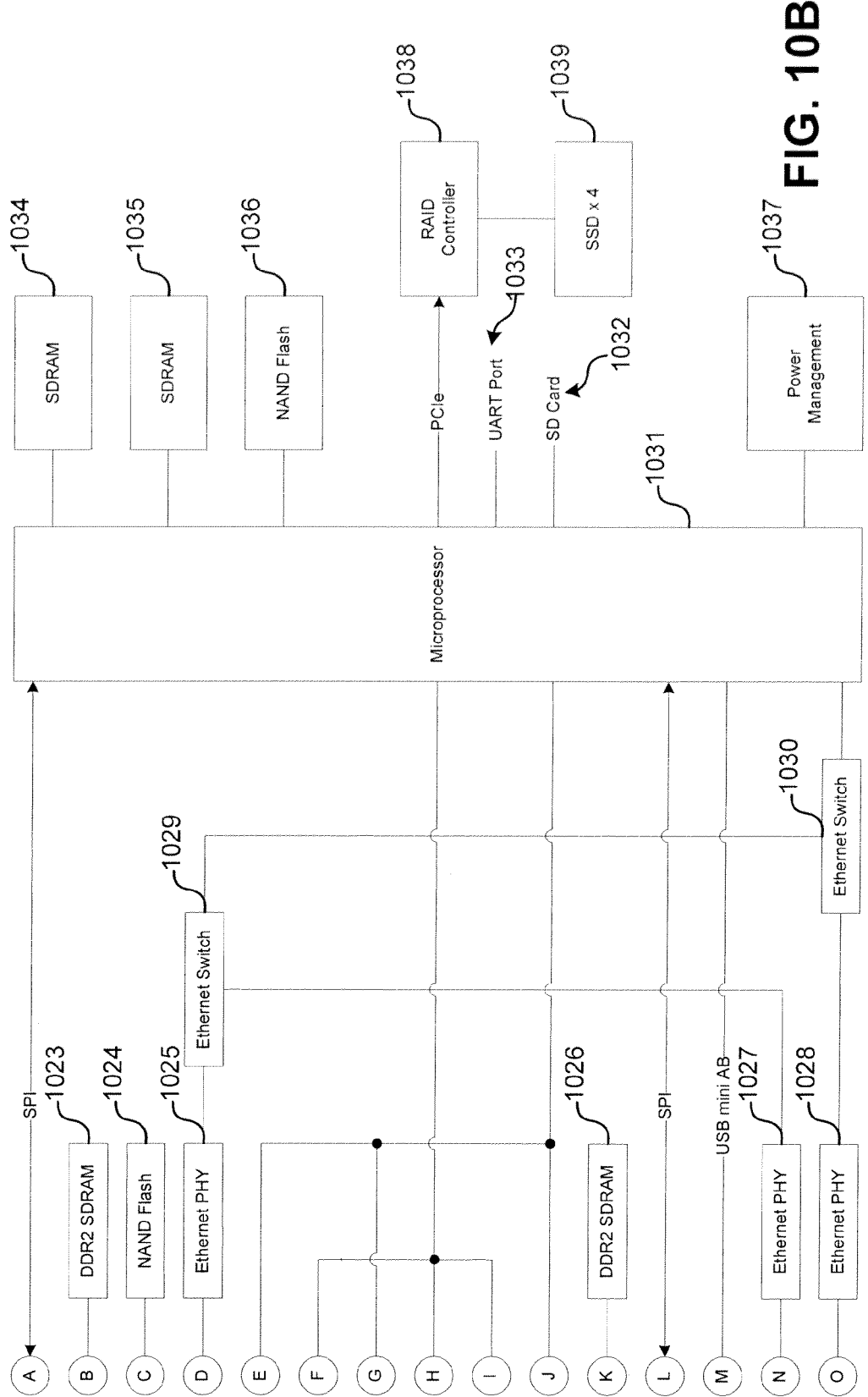

RM-4000T CONFIGURATION

RM-3000F CONFIGURATION

RECONFIGURABLE MASS DATA RECORDING METHOD AND SYSTEM

CROSS-REFERENCE TO RELATED APPLICATIONS

This application claims the benefit of U.S. Provisional Application No. 61/476,201, filed Apr. 15, 2011 and which is hereby incorporated herein by reference in its entirety.

GOVERNMENT LICENSE RIGHTS

This Patent Application has been supported in part by the Department of the Navy under Contract No. N68335-12C-0148.

TECHNICAL FIELD

The present invention relates generally to storage devices, and more particularly, some embodiments relate to data recorders.

DESCRIPTION OF THE RELATED ART

Data reordering, for example, using mission recorders, is a critical capability for a wide variety of military and commercial platforms. Mission recorders are used to record large amounts of audio, video, and telemetry data—such as, infrared, radar, visual cameras, other sensor data, and mission status data. In current missions, terabytes of data, are tagged, organized, stored, and managed by mission recorders. For example, visual data, infrared data, and radar data may need to be stored by a single data recorder in manner such that each separate data type is individually accessible.

Additionally, different data is put to different uses: for example, some data may be reviewed by flight crews to determine if the platform is ready for another mission; some data may be reviewed by damage assessment personnel to determine the success of a mission; while some data may be reviewed by mission commanders to assess the mission and plan future missions. In some cases, these data may have different classifications or different RED/BLACK statuses. All data on a recorder is treated as if it has the security level of the most protected data physically stored in the recorder. For example, if any top-secret data is stored on a recorder, the entire recorder is top-secret until the top-secret data can be physically removed. As another example, if any RED data is stored on a recorder than all data on the recorder is treated as RED, until the RED data can be removed. This treatment causes delays in providing less-protected data to personnel who need the less-protected data. For example, a flight crew, who may not have clearance to view secret data, must wait until a copy of the non-secret data stored on a recorder can be provided to them before evaluating the platform.

Data recording subsystems (data recorders) in today's military and commercial platforms/systems have limitations due to several issues (FIG. 1). First, data recording subsystems (data recorders) have multiple memory devices 105 (e.g, hard drives such as solid state drives and hard disk drives) needed to provide the necessary data storage capacity (scalable to several terabytes). The memory devices 105 may each with their own unique interface standards 102. Second, increasing memory capacity by combining multiple memory devices limits the data transfer rate (from equipment to memory device, particularly when random memory locations must be written to, as when receiving streams from multiple data sources that must also be stored in separate locations. Third, transfer of data from a large array of equipment and devices (such as sensors, computing systems, and other devices) 103, again with unique interface and connectorization 101 poses a compatibility problem for seamless interoperability. Fourth, data recorders are custom built for each military/commercial system; thus, there is no one data recorder that is adaptable to all platforms. Fifth, the design of data recorders does not allow upgradability to keep up with rapidly evolving capacity of memory devices since this design depends on specific memory devices. Memory devices evolve at a much more rapid rate (rapid increase in hard drive storage capacity every year) than the evolution of the data recorders. Sixth, current solutions do not offer physically removable memory for transfer of data to other equipment that many data recording applications require

BRIEF SUMMARY OF EMBODIMENTS OF THE INVENTION

According to various embodiments of the invention, a data recorder architecture is provided that can be reconfigured to meet the needs of a wide variety of commercial or military platforms. Physically, some embodiments of the invention provide reconfigurable connectorization planes and adapter plates to allow the data recorder to configured for a specific platform. Further embodiments provide physically reconfigurable and expandable removable memory units (RMUs). Architecturally, embodiments of the invention provide a variety of transcoding options to enable the data recorder to be installed in a wide variety of platforms and platform configurations.

Embodiments of the invention provide a removable memory unit (RMU) that facilitates concatenation of said memory modules irrespective of their individual physical interfaces, enables encryption/decryption keys (including cryptographic ignition keys (CIKs)) to reside onboard the RMU, provides for physical separation of RED and BLACK data in cross-domain environments and implements zeroization functionality onboard the RMU. Further embodiments provide a swappable IO backplane and adapter plates for incorporation into a wide variety of platforms.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Various embodiments of the invention provide a universal memory recording method and system that is cross-platform compatible, accepts data seamlessly from a number of interfaces, and allows high sustained write speeds, such as over 500 MB/s, to store this data on a removable memory, which may be upgradable as hard drive capacity increases, new technologies arise, or requirements change. Embodiments further provide an interface converter that provides on-the-fly translation at various levels (such as, physical connector translation, pin reassignment, electrical translation and data format translation) to seamlessly accept data from equipment interfaces (GigE, USB, Firewire, ARINC, RS-422, and so forth) and hard drive interfaces (SATA, P-ATA, SCSI, etc.).

Figure 1:
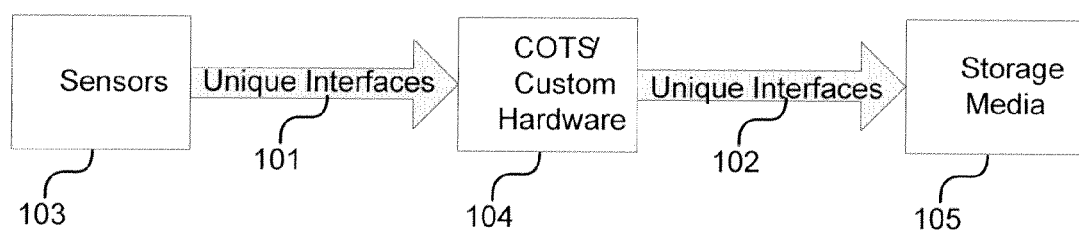
FIG. 1 illustrates a prior art system for data storage in on the move platforms.
Figure 2:
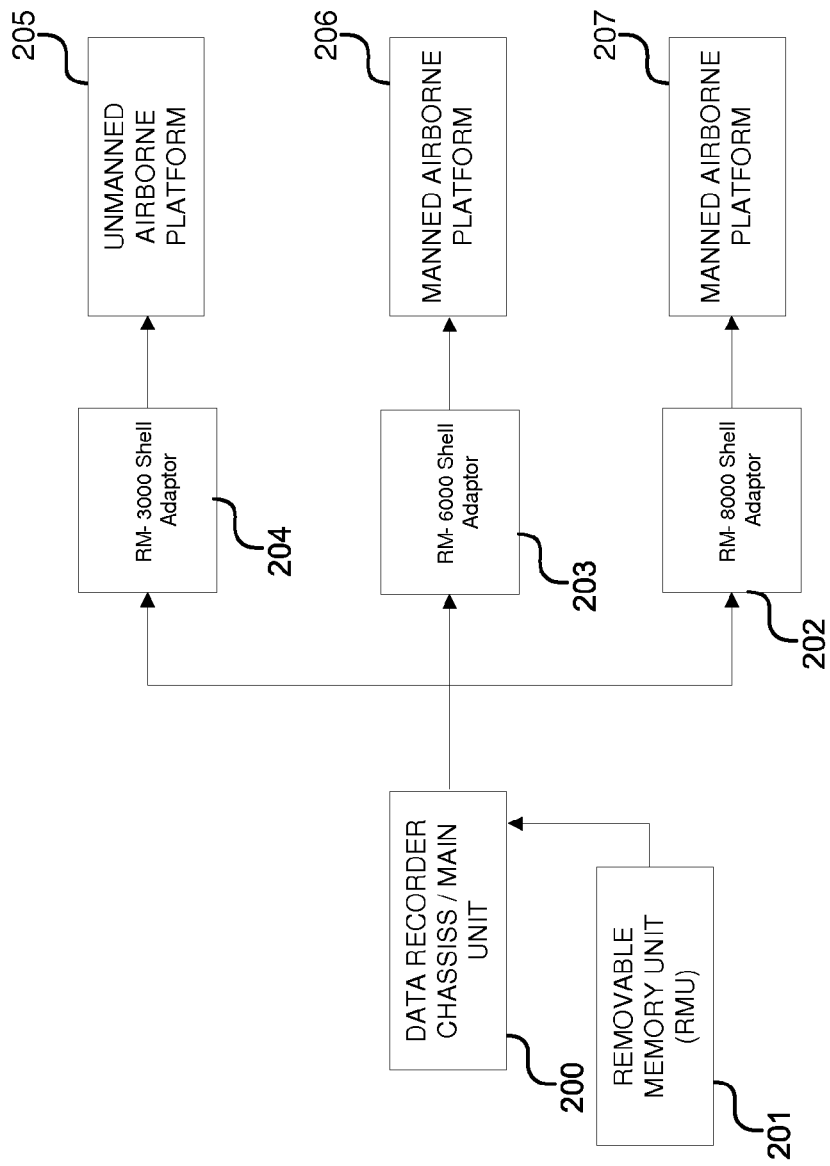
FIG. 2 illustrates some embodiments of the present invention that provide a universal automatic reconfigurable multi-protocol data recorder system that is cross-platform compatible.

FIG. 2 illustrates some embodiments of the present invention that provide a universal automatic reconfigurable multi-protocol data recorder system that is cross-platform compatible (including drop-in replacement for legacy data recorders, e.g. L3 communications RM-series data reorders for platforms such as the F-18). The illustrated embodiment comprises: (1) a data recorder chassis (main unit) 200; (2) a scalable, removable memory unit (RMU) 201; and (3) adaptor shells 202, 203, 204 to provide cross-platform compatibility for a variety of platforms 207, 206, 205. For example, the chassis shell adapters 202, 203, 204, may be configured to allow the data recorder to be installed in electronics bays in manned aircraft, 207, 206, unmanned aircraft 206, or any other platform.

FIG. 2 illustrates an embodiment of the present invention as a versatile memory recorder 200, 201 for use on a wide variety of military/commercial platforms (e.g. manned 206, 207 and unmanned airborne platforms 205) that accepts sensor data from a variety of interfaces (e.g. RS-232, RS-485, MIL-STD-1553, GigE, etc.) and stores this data on a scalable (for example, to several TB) and reconfigurable removal memory unit (RMU) 201. In this embodiment, the data recorder hardware is configured as a main unit 200 with and adaptor shell 202, 203, 204, with a removable memory unit 201. The adaptor shell 202, 203, 204, makes the system compatible with a number of airborne platforms 207, 206, 205. Further embodiments are usable in any number of on-the-move (OTM) and non-OTM platforms, such as aircraft, helicopters, unmanned aerial vehicles (UAVs), unmanned ground vehicles (UGVs), space platforms, manned ground vehicles, surface vehicles, submarine platforms, marine platforms, submersibles, sensor platforms, scientific platforms, or other data generating and recording platforms.

As described below, in some embodiments, the RMU 201 comprises a cartridge (a "mother cartridge") with its own removable memory cartridges ("daughter cartridges"). In some embodiments, the daughter cartridges comprise hard drives, installation and reconfiguration of which allows the mother cartridge's memory to be expanded or reconfigured. In further embodiments, the daughter cartridges comprise electronics modules that provide additional functionality to the recorder 200, 201, such as encryption modules used for encrypting the memory contents of the RMU 201, or crypto-ignition keys for authenticating the RMU 201, to the chassis 200. In still further embodiments, the recorder hardware 200, 201 may be configured to provide RED/BLACK separation, as described in further detail below.

In one embodiment, the main unit 200 comprises of open VPX-based hardware architecture with a hybrid transcoding subsystem that interfaces with an RMU 201 comprising a RAID controller providing a RAID based logical drive (such as a 0+1-based RMU (as described below)). This design utilizes widely supported standardized technologies such as open VPX embedded hardware, PCI express interfaces (intrinsically supported through the VPX bus), and RAID-based storage utilizing COTS solid-state hard drives (SSDs). An example of the adaptor shells of the present invention are adapter plates of different sizes can that allows a single unit of our invention to replace the various recorders (L3 communications, RM-series) on current military airborne platforms (UAVs, fighter jets, helicopters, and other aircraft). In contrast to conventional data recorders, embodiments of the invention allows updates to support advances in hard drive/memory technology. Upgrading requires only an upgrade of the RMU 201 or daughter cartridges in the RMU 201 and embedded software needs; thus, embodiments simplify logistics and obsolescence issues.

Features of some embodiments of the present invention include:

Scalable removable RMUs that confine all memory upgrades to the RMU only. Memory upgrades or interface changes, for example, only require swapping out the RMU. In contrast to prior art, in these embodiments, no modifications to the chassis/main unit are required to support memory upgrades.

Fully reconfigurable I/O connectivity, including signal rerouting (to address unique pin-out configurations) and signal translation (transcoding), which in some embodiments, completely eliminates the need for interface adaptors.

Built-in-test (BIT) capability with native support for all computer self-test methodologies. In some embodiments, BIT capability is provided in the chassis 200, the RMU 201, individual daughter cartridges, or any combination of the three.

Diverse data offload capability such that data can be removed from the system using either a docking station (a chassis or main unit 200) or through an Ethernet port included in the RMU 201.

Figure 3:
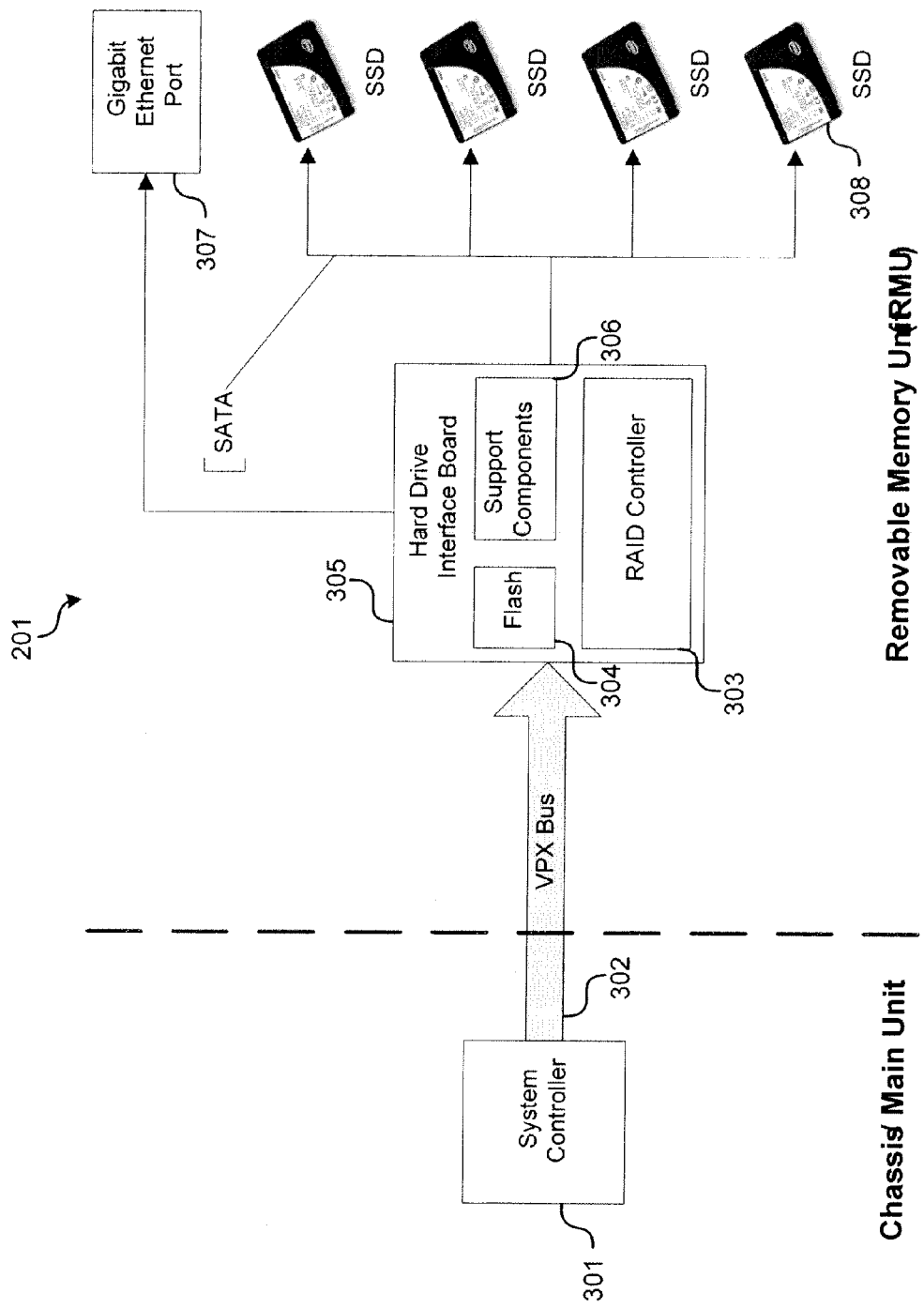
FIG. 3 illustrates an embodiment of the present invention employing a modular architecture.

FIG. 3 illustrates an embodiment of the present invention employing a modular architecture. A system controller 301 resides on a chassis/main unit 201 and interfaces with the platform electronics. When the RMU 201 is installed in the chassis 200, an open VPX backplane provides the interface bus 302 between the various system components 301, 305. The RMU comprises a hard drive interface electronics module 305, that controls various system functions. The RMU further comprises a plurality of hard drives 308, which may be separately removable, reconfigurable, and installable in the RMU 201. The hard drives 308 are coupled to the interface module 305 through a storage interface, such as SCSI, SAS, or any other storage interface. In some embodiments, the storage interface may be reconfigured by swapping out the RAID controller 303 disposed on the module 305 and by replacing the hard drives 308. In the illustrated embodiment, a RAID controller 303 disposed in the hard drive interface module 305 manages the creation of a logical drive out of the hard drives 308, manages I/O to the drives, and presents that logical drive to the system over bus 302.

Figure 4:
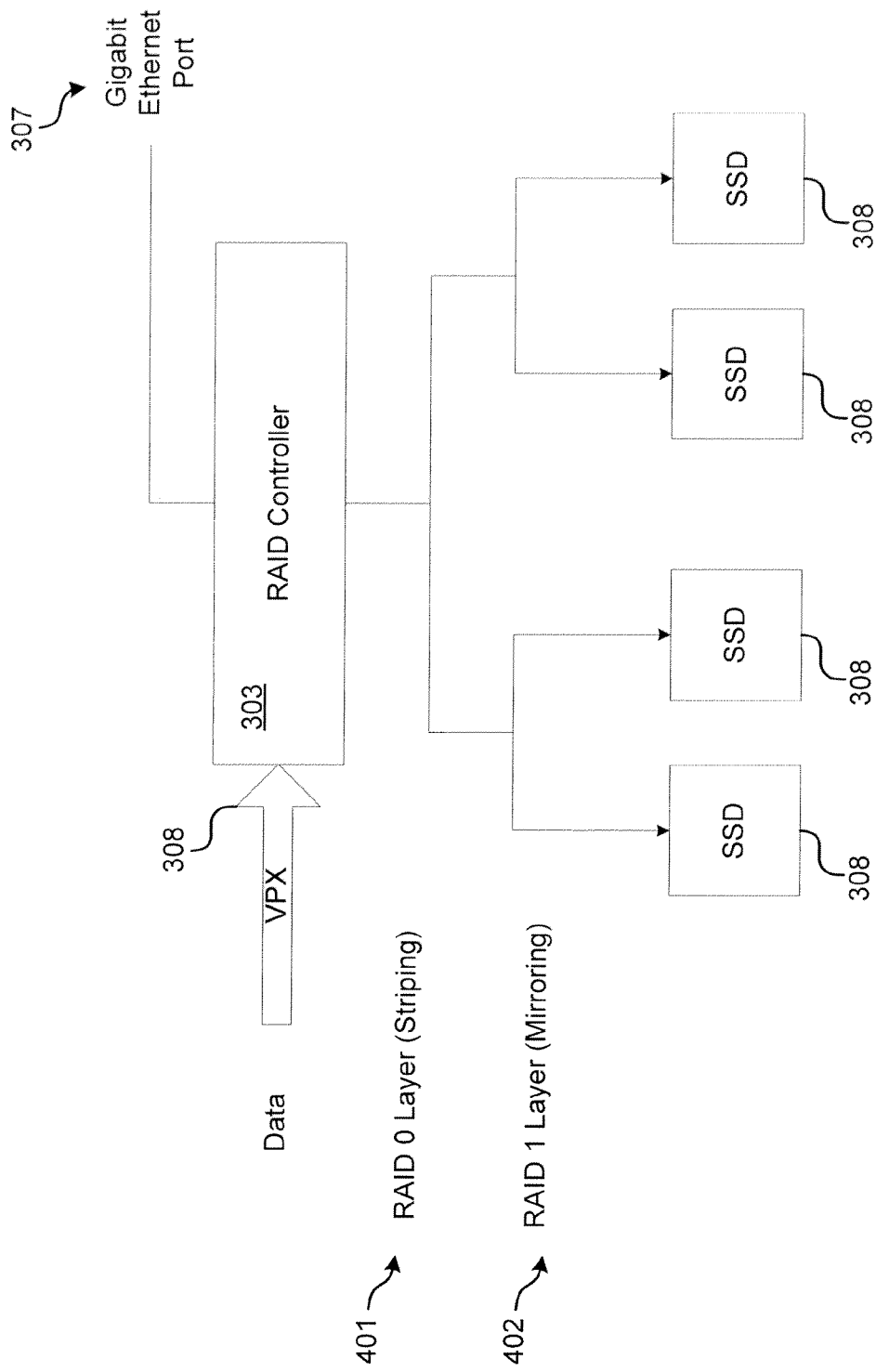
FIG. 4 illustrates a configuration for the RAID controller and hard drives of one embodiment of the invention.

FIG. 4 illustrates a configuration for the RAID controller 303 and hard drives 308 in one embodiment of the invention. In this embodiment, the RAID controller communicates and receives data over a bus 308, such as a VPX bus. In addition, the RAID controller 303 is also configured to communicate over an Ethernet port 307, such as a Gigabit Ethernet port, disposed on the RMU to allow the data stored on the RMU to be accessed when removed from the chassis. The RAID controller maintains a logical storage volume by implementing a RAID 0+1 configuration. In this configuration, data is first striped 401 in a RAID 0 layer. The striped data is then mirrored 402 and stored on the hard drives 308.

Returning to FIG. 3, a flash memory 304 disposed on the drive interface board 305 maintains necessary drives, BIT data, and may be reconfigured as appropriate for a specific application platform. Additional support components 306 disposed in the module 305 can manage communication, execution of drivers, execution of BIT protocols, and I/O through an Ethernet port 207 provided on the RMU 201.

Figure 5:
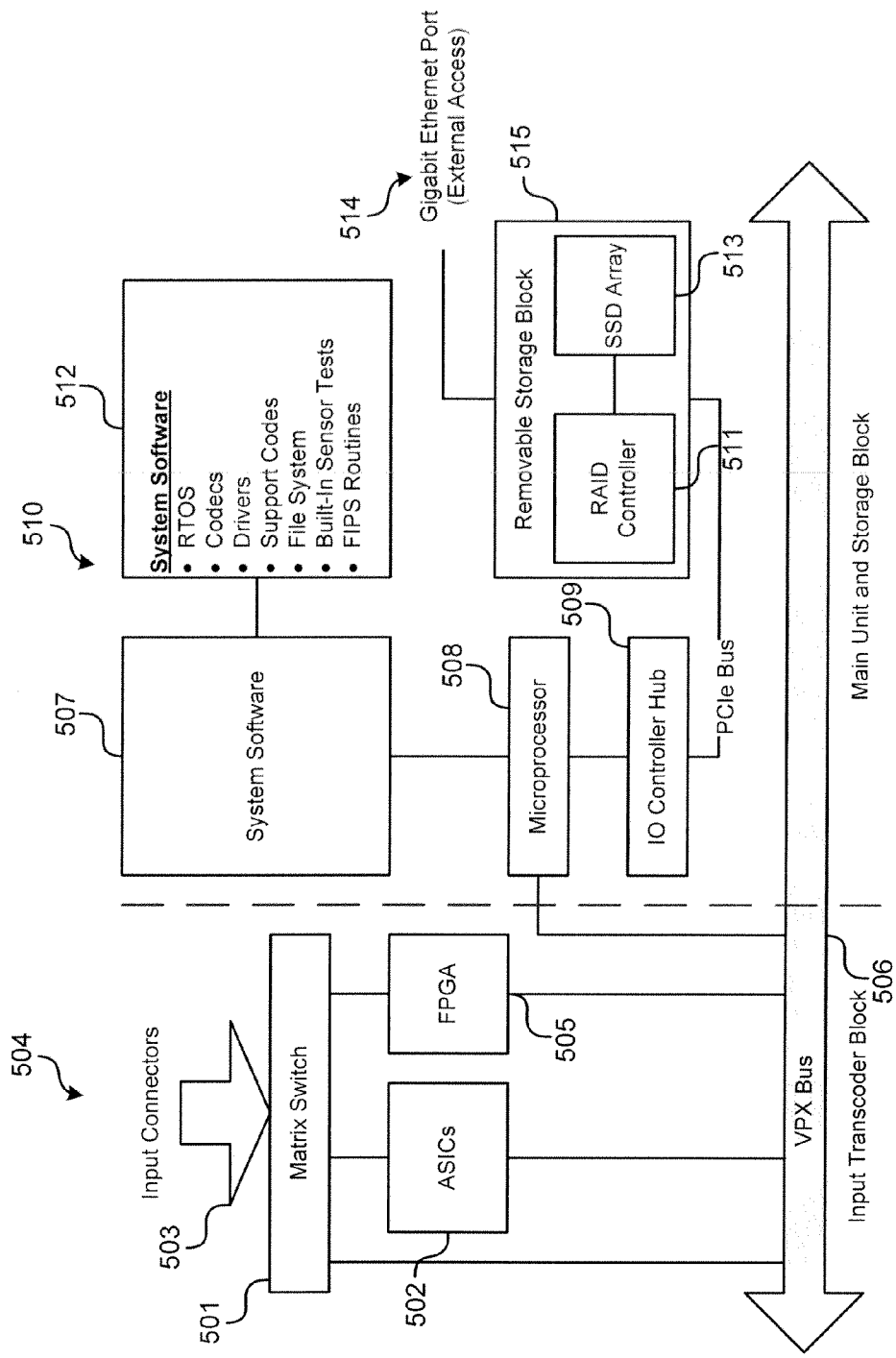
FIG. 5 illustrates further architectural details of an embodiment of the invention.

FIG. 5 illustrates further architectural details of an embodiment of the invention. In this embodiment, data interfaces 503 are supported through a hybrid transcoding subsystem 504 that provides intelligent selection of the optimal transcoding hardware 502, 505, 508 for a given interface. Data is translated into the PCI express serial format (PCIe being natively supported on the VPX backplane 506) and passed to the storage array 513. At the storage array 513, a RAID 0+1 controller 511 first stripes the data (breaks it into multiple pieces), then duplicates it to provide redundancy (as illustrated in FIG. 4). In further embodiments, other RAID configurations or other methods of providing logical storage volumes may be implemented. A main system controller 508 manages the entire process. The hybrid data transcoder 504 combines ASICs, such as COTS stand-alone transcoder ICs, software codecs implemented on system software 507 by microprocessor 508, and FPGAs 505 to manage data format translation. In further embodiments, the functions of the microprocessor 508 may also be implemented by a microcontroller. In some embodiments, the data format translation is managed based on format and resource utilization. The availability of ASICs 502, FPGAs 505, and software 507 modules for transcoding allow the system to be configured to handle a variety of data formats based on end-user preferences. For example, common data transcoding may be handled by ASICs 502, less common but resource intensive transcoding may be handled by an FPGA 505, while less resource intensive transcoding may be handled by a software module 507.

A crossbar or matrix switch 301 manages input signal rerouting to map particular data signals 303 to the transcoding module 502, 505, 508, selected for transcoding the particular data type. The transcoder 504 is managed by an intelligent transcoding heuristic that identifies and selects the optimal hardware component for input signal transcoding. Between the use of stand-alone ICs 502, software codecs 507, and FPGAs 505, any input format may be supported. The matrix switch 501 is controlled by the microprocessor 508 to rout input signals 503 are always routed to the correct transcoding element 502, 505, or 508. Once the input signals have been transcoded, the microprocessor routes the signals to an I/O controller hub 509 to provide them to the RMU 515, thereby routing them to the RAID controller 511 and hard drive array 513. In one embodiment, the I/O controller hub 509 utilizes the PCIe bus natively embedded within the VPX backplane 506.

At the RMU 515, data is passed first over the VPX connector, and then into a RAID controller 511 embedded within the RMU. In a particular embodiment, the RAID controller first stripes the data, then mirrors it. The data is subsequently stored on the hard drive (solid state drive, SSD) array 513.

In further embodiments, the matrix switch 501 is coupled to a second set of ASICS 502, FPGAs 505, microprocessor 508, controller hub 509, and storage 515. In these embodiments, the second set of components is used for a first data type, such as secured, classified, or RED data, and the first set of components is used for a second data type, such as unsecured, unclassified, or BLACK data. In these embodiments, the matrix switch 501 includes a transceiver, or is coupled to a transceiver, that may receive a signal indicating that the switch 501 should route all data to the first or second set of components. For example, when on a mission, a platform may fly over territory where all data must be classified. In these cases, the switch 501 will route data to the classified set of components, for separate and distinct transcoding and storage of the classified data. In some embodiments, the matrix switch 501 performs the switching in a manner that is not reversible until after the mission. For example, the matrix switch 501 may use a one-way switch that causes all data to be stored using the classified components until physically reset. In some embodiments, the matrix switch 501 receives an encrypted signal to cause it to re-route the data. For example, the matrix switch 501 may be provided with a one-time pad or other symmetric encryption key prior to the mission, the matrix switch 501 may utilize an asymmetric key encryption system, or the matrix switch 501 may utilize a more obscure method of authentication. For example, in one embodiment, an analog signal, or "fingerprint" is transmitted to the matrix switch 501 and is compared to an analog signal stored by the matrix switch. If some function of the two signals meets a condition, the matrix switch 501 reroutes the data. For example, the matrix switch 501 might compute the sum and the different of the two signals (the beats) and determine if they match a predetermined key.

In contrast to existing mass storage solution (specifically, in areas such as avionics), which are limited in their write speeds, the illustrate embodiment may provide improved write speeds, particularly in non-sustained or random data writes. This is possible due to a unique parallelization of write operation. RAID 0 is designed specifically to address this need, and is a standard RAID level. However, the use of a nested RAID 1 layer adds redundancy in particular embodiments. The PCIe interface 506 offers a standard interface to the data recorder, while the RAID controller 511 itself provides support of diverse memory interfaces (thereby providing support for both current and forthcoming mass storage devices).

Figure 6:
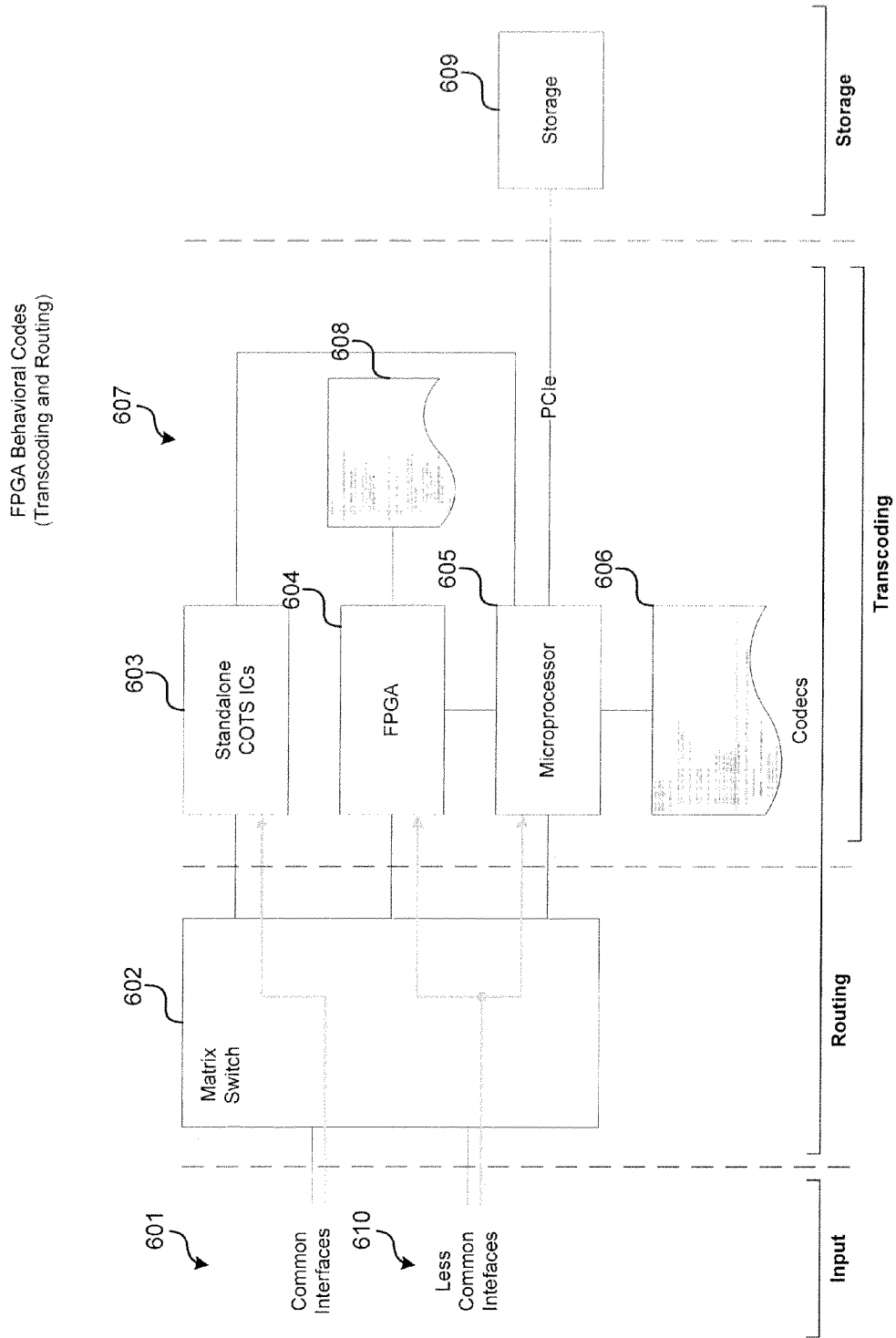
FIG. 6 illustrates a hybrid transcoding architecture of an embodiment of the invention.

FIG. 6 illustrates a hybrid transcoding architecture of an embodiment of the invention. In the illustrated embodiment, the transcoding architecture includes a plurality of commercial off the shelf (COTS) integrated circuits 206 that are preconfigured to transcode one data type into another. In other embodiments, the ICs 206 may be supplanted or replaced by on one or more custom ASICs pre-configured to transcode one data type into another. These preconfigured transcoding modules 603 are selected according to common data types found on typical platforms of interest. When an embodiment of the invention will be installed on a platform providing one or more of the data types for which a preconfigured module 603 is provided, the matrix switch 602 is used to route the interfaces 610 providing those signals to the appropriate module of modules 603.

However, many platforms of interest contain interfaces and data types that are not commonly shared amongst a large variety of platforms, or for which COTS ASICs are not available. Embodiments of the invention employ FPGAs 604 and software codecs 606 executed on a microprocessor 605 to transcode such data types. Prior to installation on a given platform, a plurality of codecs 606 are stored for execution on the microprocessor and a plurality of FPGA behavioral codes are stored for configuration of the FPGA 604. When the embodiment is installed in a particular platform, the matrix switch 602 is configured to map the data interfaces 610 that are not equipped with dedicated preconfigured module 603 to an FPGA of the plurality 604 or to the microprocessor 605 for transcoding. In the first case, an appropriate behavior code 608 is loaded onto the FPGA to configure the FPGA for the transcoding. In the second case, the microprocessor executes an appropriate codec 606.

Accordingly, as illustrated, common interfaces are supported using stand-alone ICs, while the FPGA and system microprocessor support hardware and software transcoding, respectively, for obscure or new interfaces. These embodiments transparently support legacy, current, and forthcoming interface standards, as well as provide for rerouting of electrical signals incident at the airframe interface connectors. While the transcoding process can be managed via a variety of approaches, power and space considerations warrant an optimized solution. This approach is an optimized design that utilizes a collection of stand-alone COTS transcoder ICs, software codecs, and FGPA behavioral codes.

When the dedicated module 603 or FPGAs 604 are utilized, the transcoded signals are provided the microprocessor 605. In every case, after transcoding, the transcoded signals are stored on the storage module 609.

Additionally, in some embodiments, dedicated transcoding ICs 603 may be omitted. For example, in high-security situations, sufficiently secure foundries may not exist to provide some otherwise standard transcoding ICs. In such cases, FPGAs or software codecs may be utilized exclusively.

Figure 7:
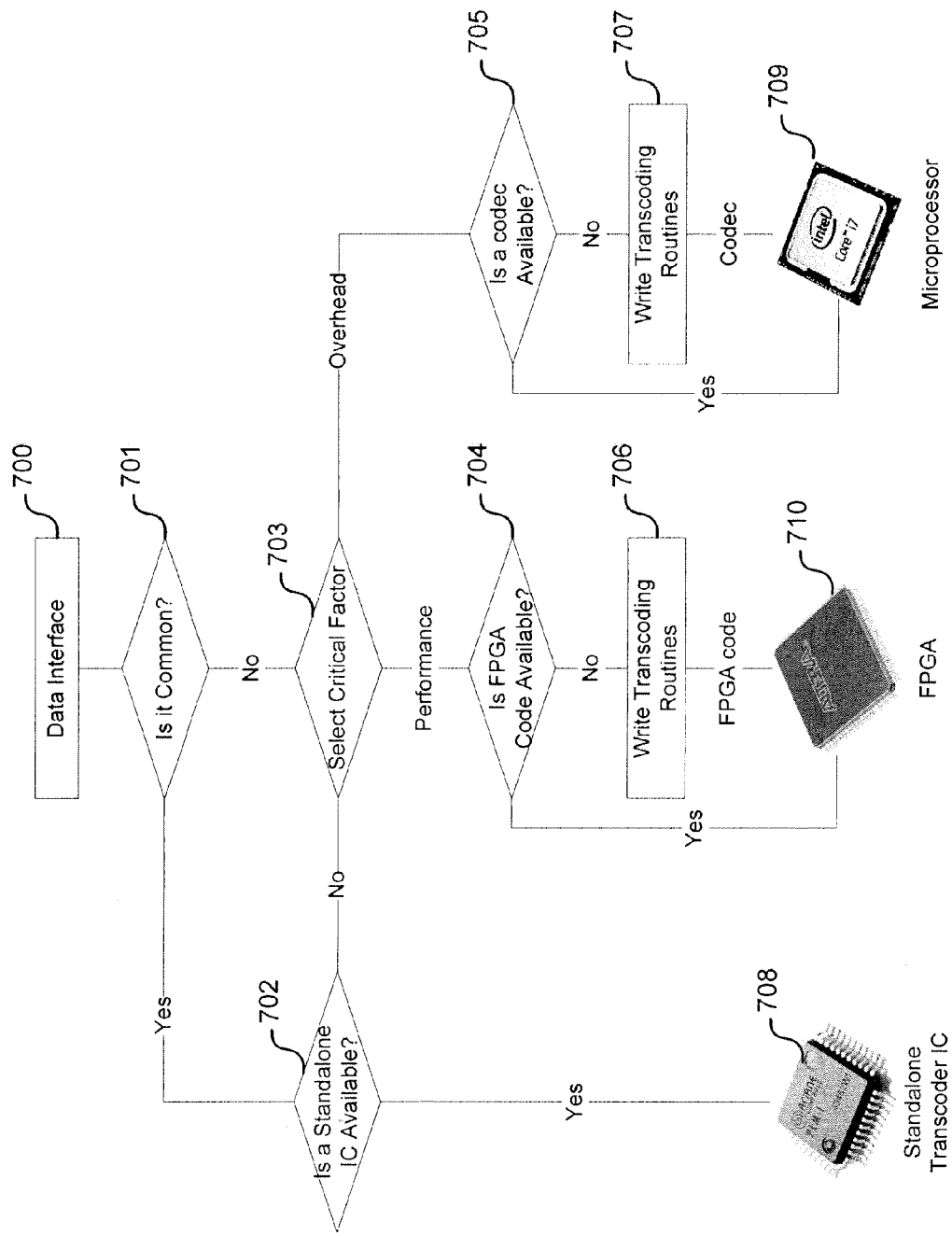
FIG. 7 illustrates an intelligent transcoding heuristic for managing the transcoding subsystem that may be executed by some embodiments of the invention.

FIG. 7 illustrates an intelligent transcoding heuristic for managing the transcoding subsystem that may be executed by some embodiments of the invention. In some embodiments, the management process may be executed during adaptation of a generic data recorder to be installed in a specific platform. As discussed with respect to FIG. 6, the generic adapter may have a plurality of pre-existing dedicated circuits for transcoding signals, a plurality of FPGAs that may be adapted to transcode other data signals, and one or more microprocessors for transcoding other data signals. In some embodiments, the generic adapter is further equipped with a bank of pre-written behavioral codes for FPGA transcoding and a bank of pre-written software codes for microprocessor transcoding. To support input connectivity reconfigurability, some embodiments employ a signal switch.

According to the illustrated process, each data interface 700 of the specific platform in which the recorder will be installed is evaluated. If the data interface 700 is a common interface 701 that has a dedicated standalone IC 702, then the matrix switch 602 is configured to route signals from the interface 700 to the available transcoder IC 706. For example, data on interfaces such as RS-232 and IEEE-1394 (FireWire) may frequently have stand-alone transcoding ICs available.

If a dedicated transcoding IC is not available 701 or 702, then the interface is evaluated to determine whether FPGA or microprocessor transcoding is preferred. There are a variety of reasons why an FPGA or microprocessor may be preferred for transcoding. For example, microprocessor code is far easier to write than FPGA code, so where possible (i.e., in applications where the codec overhead is acceptable), some embodiments employ the microprocessor. For performance critical applications where a stand-alone IC is not available but stand-alone IC performance is needed, some embodiments employ the FPGA. Accordingly, in some embodiments, the FPGAs 710 are reserved for data types and interfaces for which a codec is not available 705 and impractical to write 707. If a preexisting FPGA behavioral code is available 704 for transcoding the data on the interface 700, then it is loaded onto an FPGA 710 and the matrix switch 602 routes the interface 700 onto the configured FPGA 710. Otherwise, a system user must write a transcoding routine 706 for transcoding the data from interface 700 using the FPGA 710.

If codec overhead is acceptable, then the data is routed to the microprocessor for software transcoding. If a pre-existing software codec is available 705 then it is executed as needed by the microprocessor 709. Otherwise, a transcoding routine must be written 707 by a system user and stored for use as needed.

Figure 8A:
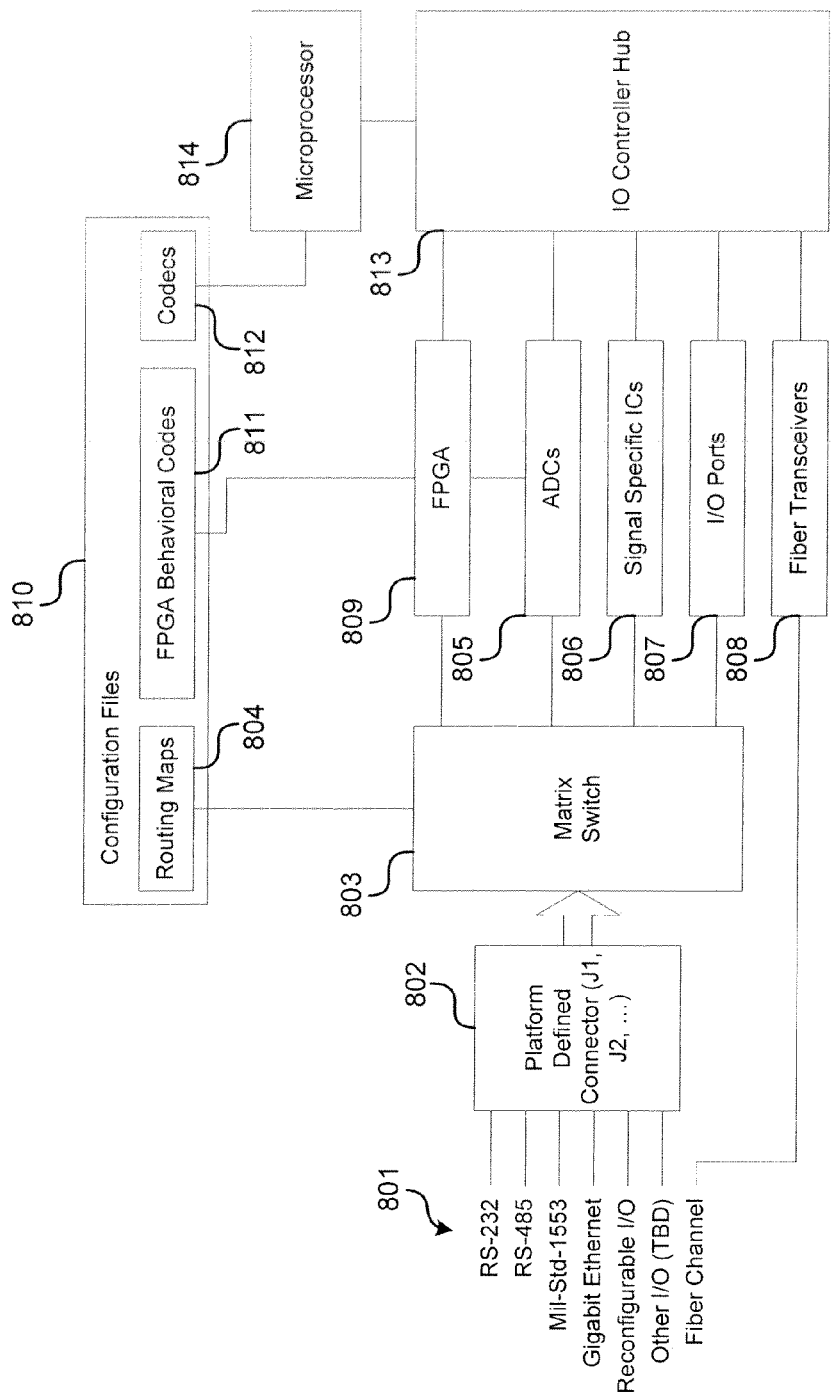
FIG. 8A illustrates an architecture of an embodiment of the invention after installation into a platform.

FIG. 8A illustrates an architecture of an embodiment of the invention after installation into a platform. The illustrated embodiment includes a platform defined connector plane 802 as part of the recorder chassis. The connector plane 802 provides a physical connector to a plurality of data interfaces 801. For example, the interfaces might include VPX, RS-232, RS-485, Mil-Std-1553, Ethernet, other I/O ports, or fiber channels. The pins of the connector 802 are coupled to the matrix switch 803 which routes the interfaces to selected transcoding modules 809, 806, or I/O ports such as Ethernet port 807. Additionally, analog to digital converters (ADCs) 805 may be provided for converting analog signals to digital signals prior to transcoding. In particular embodiments, analog signals are routed to an ADC 805 which then provides the signals to an FPGA 809 or microprocessor 814 for transcoding. In some embodiments, fiber channels are provided directly to fiber transceivers 808 from the connector backplane 802 without routing through the matrix switch 803. In some embodiments, one or more of the I/O ports 807 may be implemented using an FPGA 809. For example, FPGA behavioral codes 811 may be written to allow an FPGA 809 function as an Ethernet interface.

In this embodiment, the microprocessor 814 is coupled to an I/O controller hub which provides input and access control to the modules 809, 805, 806, 807, 808. The microprocessor 814 is coupled to a memory storing a plurality of configuration files 810. The configuration files 810 include routing maps 804 to control the routing of the matrix switch 803, FPGA behavioral codes 811 for configuring the FPGAs 809 for required transcoding, codecs 812 for software transcoding, and other necessary support configuration files such as hardware profile settings, and initialization data. In some embodiments, the configuration files 810 can be maintained either onboard the data recorder hardware in a platform agnostic manner, or loaded for each sensor suite. In some embodiments, the various transcoding elements 809, 805, 806, configure themselves in or near real time and are ready to collect and record data.

In some embodiments, system components are configured to tag data blocks to indicate the data type. For example, the transcoder module used for a specific data type may be configured to insert data tags indicating the data type into the data stream. Alternatively, the microprocessor 814 may add these tags as data is received. For example, the microprocessor 814 may label data based on which transcoder it was received from. In these embodiments, the data may be provided to the storage block through the IO controller hub 813 as a single stream. The different data streams may be separated after retrieval of the data from the storage block based on the tags.

In other embodiments, the data is provided to the storage block by the IO controller hub 813 as separate data streams. In some such embodiments, different drives of the array may be used for different data types, different file locations may be allocated for different data types, or different data streams may be stored in different logical storage locations.

Figure 8B:
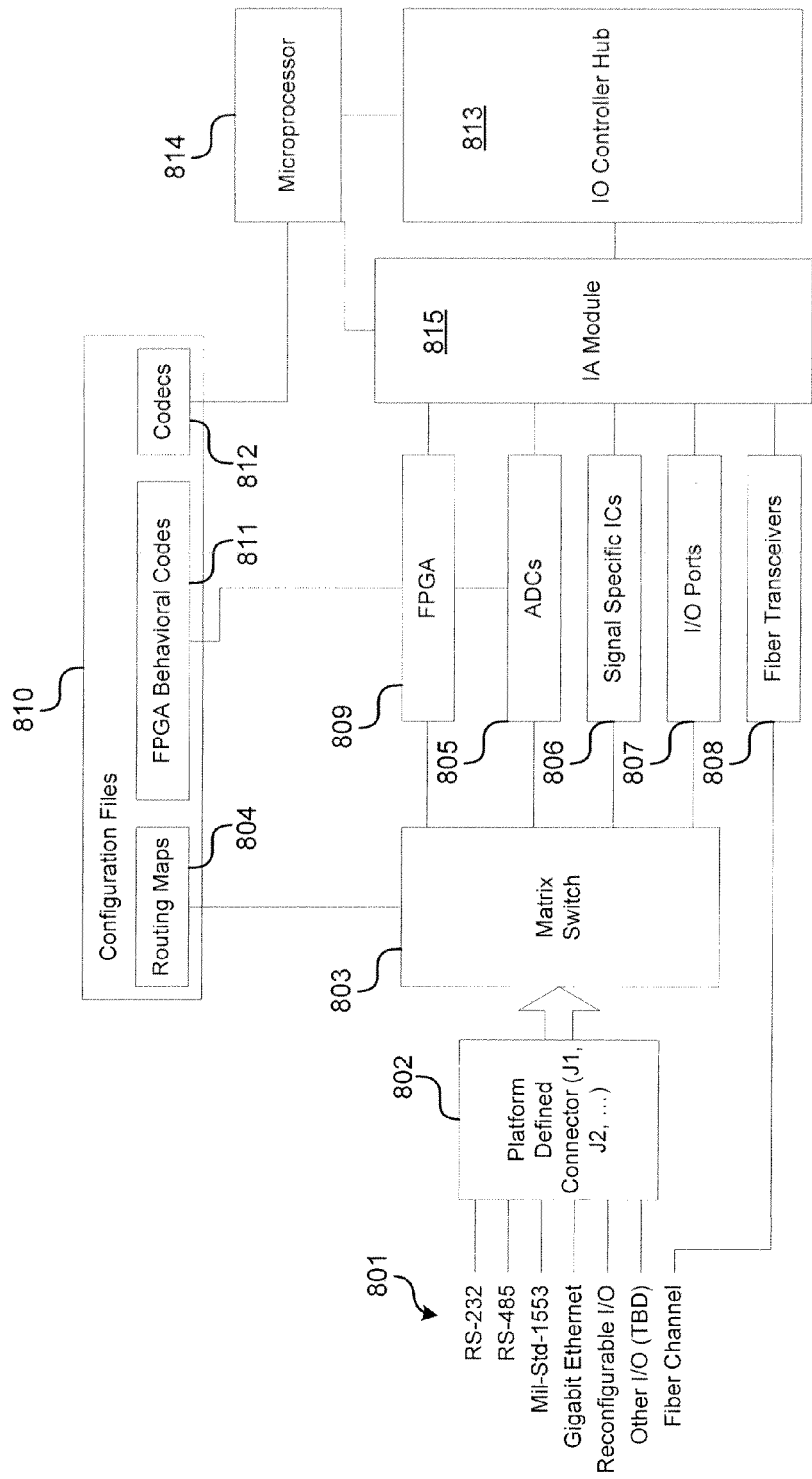
FIG. 8B illustrates an embodiment of the invention utilizing an information assurance module.

FIG. 8B illustrates an embodiment of the invention utilizing an information assurance module 815. In some embodiments, the IA module 815 may include encryption modules and tagging modules for Top Secret (TS), Secret (S) and Unclassified (U) data. Other embodiments, may perform tagging and encryption based on other parameters, such as RED/BLACK status. During operation, all data may be encrypted by the IA module 815 with at least a first level of encryption. Data marked as Secret or Top Secret may then be encrypted using a second level of encryption. Data marked as Top Secret is then encrypted using a third level of encryption. Accordingly, these embodiment utilize the TS/S/U data tagging to provide efficient routing through system including these three (3) levels of security without necessity to decrypt the data. These embodiments will allow seamless data transfer from the lower security level networks to higher security level networks.

Figure 9:
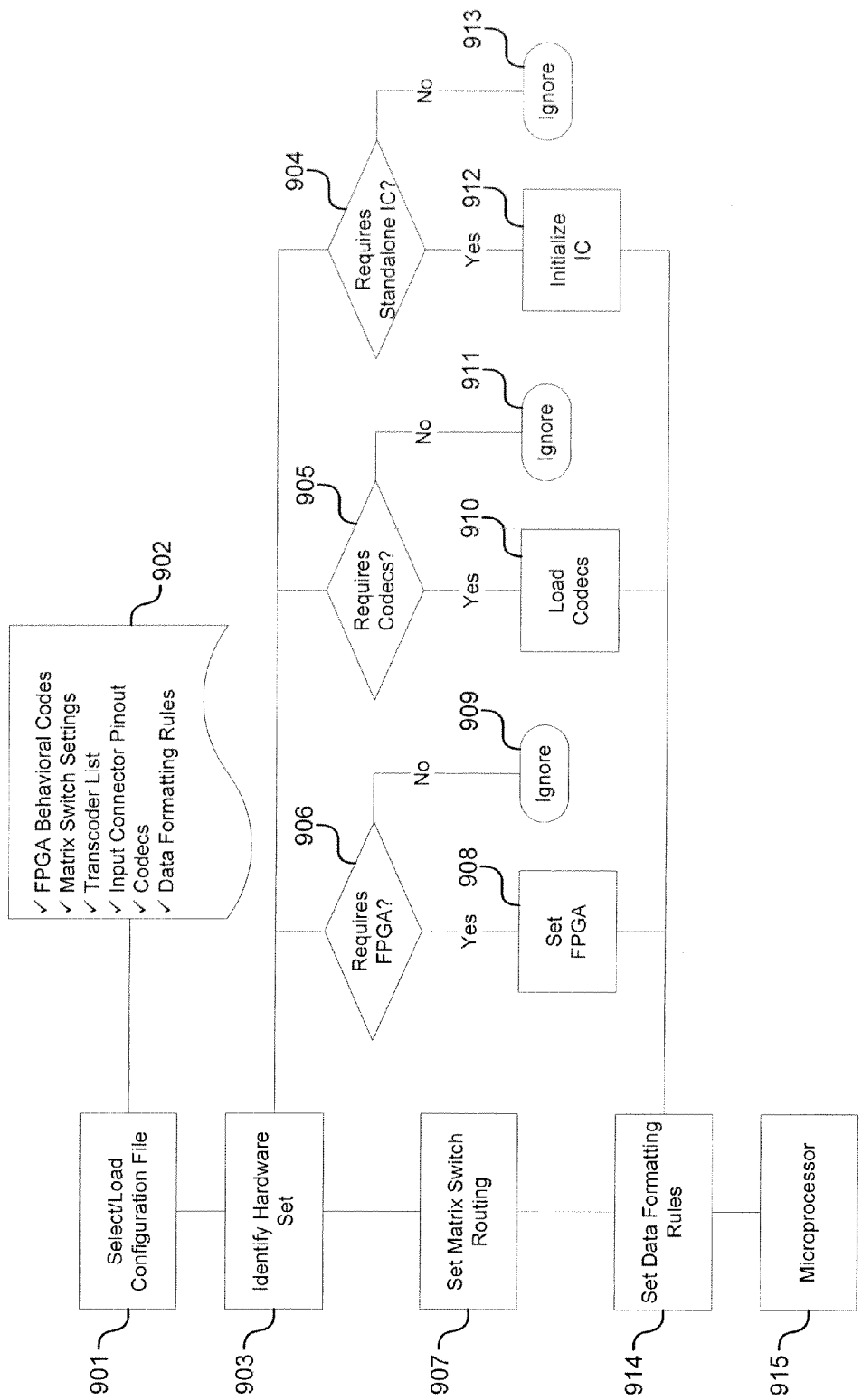
FIG. 9 illustrates an initialization process that may be executed by some embodiments of the invention.

FIG. 9 illustrates an initialization process that may be executed by some embodiments of the invention. This process illustrates a method that may be executed when the recorder is installed in a specific platform or when the hardware configuration of a platform changes. In this process configuration files 902 are either loaded or selected from a stored set of configuration files 901 according to the specific platform in which the recorder is being installed. The configuration files may include FPGA behavioral codes, matrix switch settings, transcoder listing, input connector pin out data, codecs, data formatting rules, and other configuration settings.

The system 902 performs an identification method using the connector backplane and configuration settings 902 to identify the set of installed hardware 903 and the data types that will be provided by the hardware set 903.

After identifying the hardware set, the matrix switch routing 907 is set to route different data signals to FPGAs, the microprocessor, or ICs as indicated by the configuration files 902. Additionally, using the configuration files 902, the system determines if the hardware set 903 requires FPGA transcoding 906. If so, then FPGA behavioral codes are loaded to set particular FPGAs 908 for transcoding. If not, then the FPGAs are ignored 909. If the hardware set 903 requires software transcoding 905, then codecs are loaded 910 for execution by the processor as needed. If not, then the codecs are ignored 911. If the hardware set 903 requires dedicated IC transcoding 904, then the appropriate dedicated ICs are initialized 912. If not, the ICs are ignored. In various embodiments, the steps 907, 906, 905, and 904 may be performed concurrently or sequentially.

After the transcoding modules are initialized, and the matrix switch is routed, then the system sets data formatting rules 914. For example, packet size, delimiters characters in between fields, block sizes in block recorder, parity settings, and other predetermined settings set by the target platform operator. In some embodiments, where there is no a priori data formatting provided by the system operator, raw data of the type to be provided by the system may be evaluated to determine desired data formatting rules. Finally, the microprocessor is initialized 915 for data recording operations.

Figure 10A:
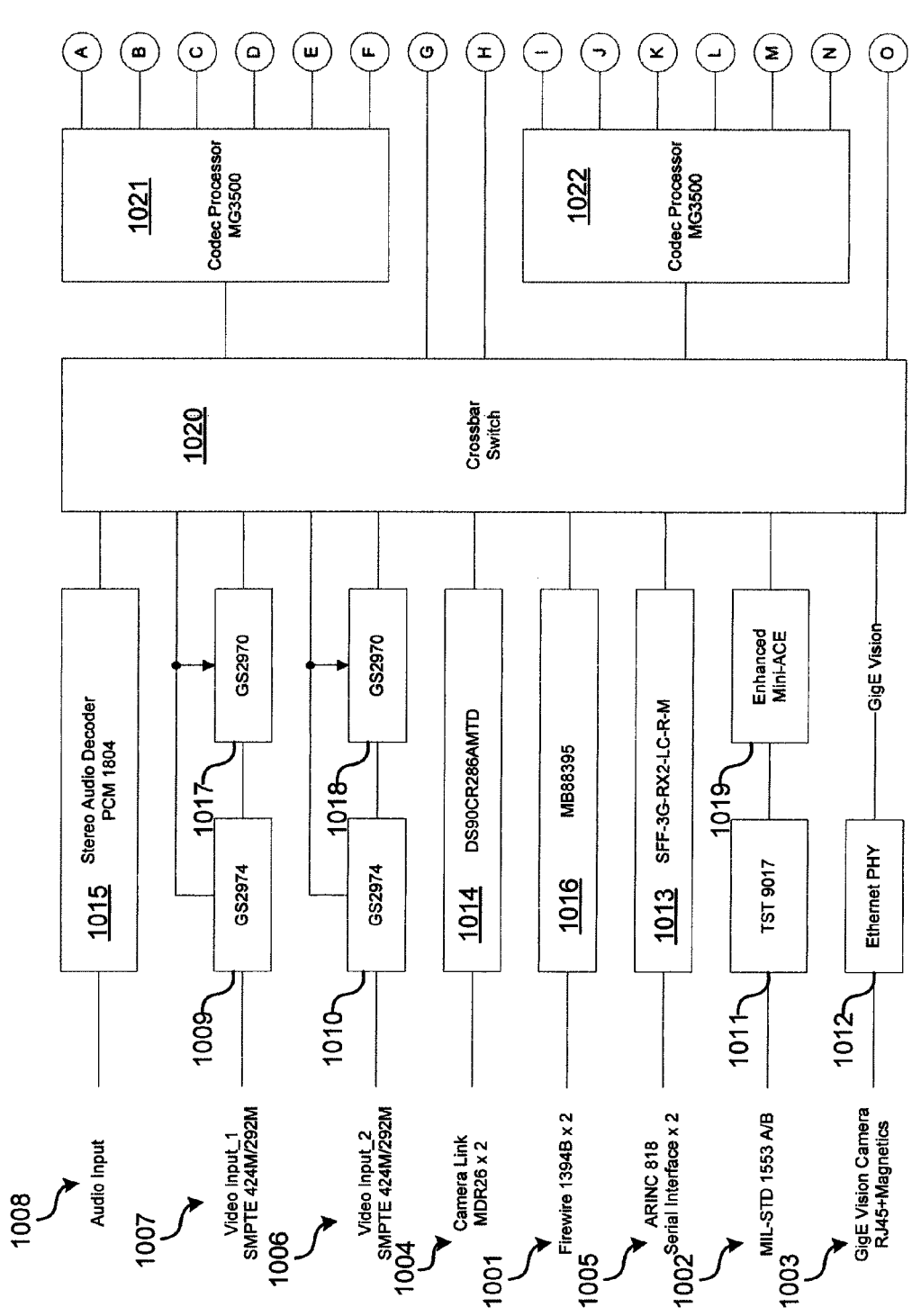
FIG. 10 illustrates an embodiment of the invention based on a I/O card based on our transcoding architecture, a single board computer that runs the data recorder system and commercially available electronic components.

FIG. 10 illustrates an embodiment of the invention based on a I/O card based on our transcoding architecture, a single board computer that runs the data recorder system and commercially available electronic components. In this embodiment, various inputs 1008, 1007, 1006, 1004, 1001, 1005, 1002, 1003 are coupled to a corresponding plurality of dedicated transcoders. In this embodiment, an audio input 1008 is coupled a stereo audio decoder 1015, such as TI's PCM1804 ADC. A first video input 1007, for example an SMPTE 424M/292M video input, is coupled to an equalizer, such as Gennum's GS2974 equalizer and a video receiver, such as Gennum's GS2970 SDI receiver. A second video input 1006 is also coupled to an equalizer 101 and receiver 1018. One or more camera links 1004, such as a 3M Mini D Ribbon MDR26 connector is coupled to a receiver 1014, such as National Semiconductor's DS90CR286AMTD low voltage differential signaling receiver. A firewire port 1001 is connected to a video transcoder 1016 such as Fujitsu's MB88395. A fiber port 1005, such as an ARINK 818 serial interface is coupled to a fiber transceiver 1013, such as a COTSWORKS' SFF-3G-RX2-LC-R-M media conversion transceiver. A MIL-STD 1553 A/B input 1002 is coupled to a transformer 1011 such as a Beta Transformer Technology Corp. TST 9017 transformer and a terminal 1019, such as DDC's Enhanced Mini-ACE transformer. A gigabit Ethernet interface 1003 such as a GigE vision Camera interface using an RJ 45 with magnetics connector is coupled to an Ethernet phy 1012 module, to provide a GigE Vision signal.

These modules are coupled to a crossbar switch 1020 that is configured to selectively route output signals to one of two codec processors 1021, 1022, such as Maxim MG3500 HD H.264 video codec SoCs. The signals may also be routed directly to memory, such as RAM 1023 or 1026, or Flash memory 1024. The signals may also be routed to various Ethernet PHY modules 1025, 1027, 1028, which are connected to the microprocessor 1031 via various Ethernet switches 1029, 1030. The signals may also be routed directly to the microprocessor 1031. The microprocessor 1031 may also be coupled to RAM modules 1034, 1035, Flash modules 1036, a RAID controller 1038 which is coupled to a set of solid state drives 1039, a UART port 1033, an SD Card 1032, and a power management module 1037.

Figure 11:
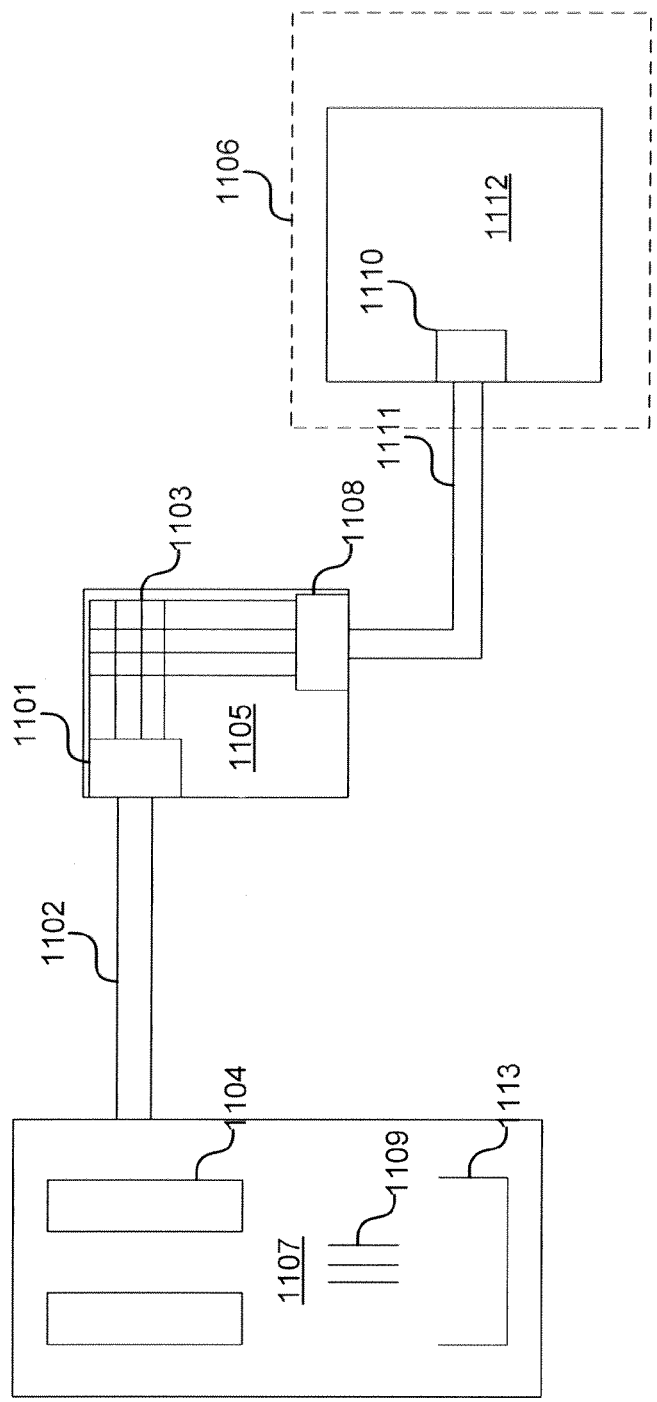
FIG. 11 provides an illustration of crossbar architecture implemented in accordance with an embodiment of the invention.

FIG. 11 provides an illustration of crossbar architecture implemented in accordance with an embodiment of the invention. The architecture includes an avionics unit 1107, removable memory unit (RMU) bays 1104 are disposed in the avionics unit 1107. The avionics unit 1107 includes a installation/removal/carry handle, and cooling fans 1109. In this embodiment, the avionics unit 1107 is coupled to a crossbar interconnect module housing 1105. The housing 1105 includes interchangeable avionics unit interconnect ports 1101, which may be electrical or optical interconnects, which couple the avionics unit 1107 to the crossbar housing 1105 via wiring harnesses or connectors. An electrical/optical crossbar matrix 1103 is disposed within the housing 1105. The crossbar matrix 1103 is coupled to an avionics bay 1112 disposed in an aircraft 1106 via interchangeable avionics bay ports 1108, a wiring interconnect 1111, and an avionics bus 110.

The embodiment shown in FIG. 11 provides for automatic aircraft recognition when an avionics unit 1107 with features such as removable memory unit bays 1104, installation/removal/carry handles 113, and cooling fins 119 is inserted (i.e., installed in an aircraft 1106 avionics bay 1112. Automatic aircraft recognition and reconfiguration is accomplished by an I/O module disposed in the housing 1105 which senses the installation of interchangeable interconnect ports 1101, 1108. Upon initial successful reconfiguration, which includes the re-routing and conditioning (e.g., voltage level conversion) of power lines and signal lines contained the wiring harnesses/connectors 1102, 1111. The data protocols used by the aircraft's avionics bay 1112 are sensed and electronics within the crossbar matrix 1103 provide for protocol conversion such that the data communications on the aircraft's avionics bus 1110 are effectively and dynamically converted to a format usable by the avionics unit 1107, e.g., recorder, storage unit, reconnaissance module, etc.

FIGS. 12A-I illustrate the mechanical design of an embodiment of the invention. The illustrated embodiment comprises a chassis or main unit 1206. In this embodiment, the chassis 1206 is smaller than the form factor required by a predetermined class of platforms. Adaptor shells 1217, 1218 ensure mechanical compatibility and mechanical connectorization with different platforms. For example, adaptor shell 1217 mounts to the front of the chassis 1206 to allow the recorder main unit 1206 to be installed in an RM-3000F configuration, while adaptor shell 1218 mounts to front of the chassis 1206 to allow the unit 12016 to be installed in an RM-4000T configuration.

The chassis 1206 further comprises one or more bays 1208 to allow installation of mother cartridges 1210. The bays 1208 may be protected by environmental sealing doors 1221 which are opened by contact with the mother cartridge 1210. Connector plugs 1207 are coupled to a backplane electronics system 1204, such a printed circuit board, to provide an electrical connection to the mother cartridges 1210. The chassis 1206 further comprises a handle 1203 mounted to the rear of the chassis and a connector backplane 1216. The illustrated connector backplane 1216 include data connectors 1201 and a power connector 1202. In some embodiments, the connector backplane 1216 may be replaced with a different connector backplane to configure the chassis 1206 according to the specific platform. In other embodiments, the data connector 1201 has sufficient connectorization to encompass the class of platforms in which it may be installed.

The mother cartridges 1210 comprise connector 1209, which is configured to mate with the connectors 1207. The mother cartridges further comprise a plurality of receptacles 1211 for receiving daughter cartridges 1213. The daughter cartridges 1213 may comprise hard drives, encryption information storage devices, crypto-ignition keys, or other functional modules. The mother cartridges further include an electronics system 1220, including electrical connectors 1221 for the daughter cartridges 1213 and the electrical connector 1209. Additionally, in some embodiments, electronics system 1220 includes a RAID controller, operable to create one or more logical drives out of the daughter cartridges 1213 and present them to recorder main unit 1206. In further embodiments, the electronics system 1220 includes other modules configured to enable other features of daughter cartridges. For example, the system 1220 may include an authentication module to determine if a daughter cartridge storing a crypto-ignition key is authentic. A handle 1212 for removing the mother cartridge 1210 from the main unit 1206 may also be provided at the rear of the mother cartridge 1210. The daughter cartridge 1210 may further include a door 1219, which is opened by contact with data connector 1217. In some embodiments, the daughter cartridges 1213 are simply removable hard drives and the receptacles 1211 are hard drive bays.

In the illustrated embodiment, a daughter cartridge 1213 comprises a housing 1225, at least one electronics module 1222, a circuit board 1226, a connector 1223, a door 1224 in the housing, and a handle 1215. In the illustrated embodiment, the arrangement of the door 1224 and the housing 1225 is similar to that of the mother cartridge's 1210 door 1219. Specifically, the door 1224 is pushed open by contact with the electrical connector 1221 in the mother cartridge 1210 when the daughter cartridge is inserted into the receptacle 1211. Additionally, in some embodiments, the receptacle 1211 is also blocked by a door which is opened by contact with the leading edge of the housing 1225. This door in the mother cartridge may be placed analogously to the door 1208 in the chassis 1206. Additionally, like the door 1219, the door 1224 may be angled to reduce the total clearance length of the door 1224 with respect to the electrical connector 1221. The door 1224 may provide an environmental seal for the connector 1223 and the rest of the internal components of housing 1225. In further embodiments, the door and housing 1225 are insulated to provide TEMPEST protection.

When the daughter 1213 is installed in the mother cartridge 1210, the electrical connector 1221 mates with the electrical connector 1223. As described above, various communications interfaces may be used in the communication between the mother cartridge 1210 and daughter cartridge 1213. The electrical connector 1223 is coupled to a circuit board 1226 that is coupled to one or more electronics modules 1222. For example, the circuit board 1226 and electronics module 122 may comprise a hard drive such as a solid state drive or hard disk drive. The installation of multiple such daughter cartridges 1213 in the mother cartridge allows the RAID controller 1220 to create a logical storage volume for the chassis 1206.

Figure 12A:
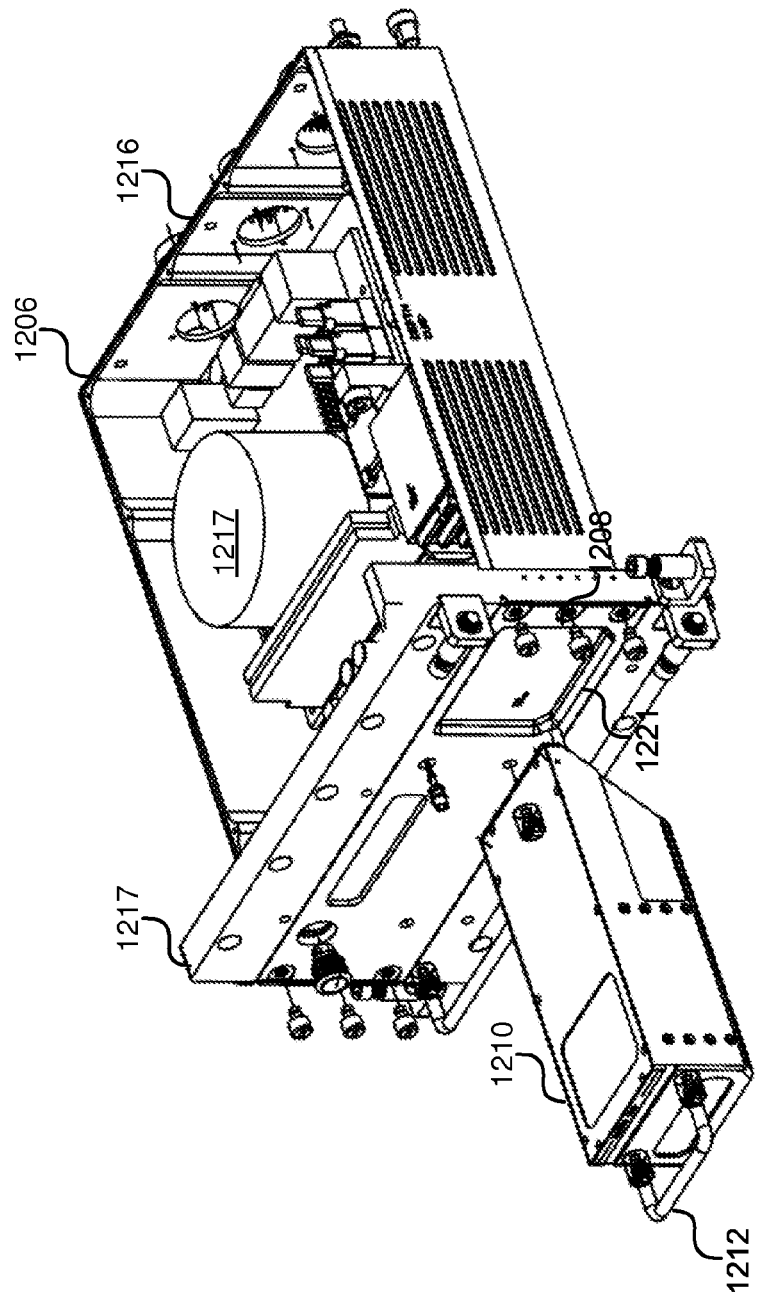
FIGS. 12A-I illustrate the mechanical design of an embodiment of the invention.
Figure 12C:
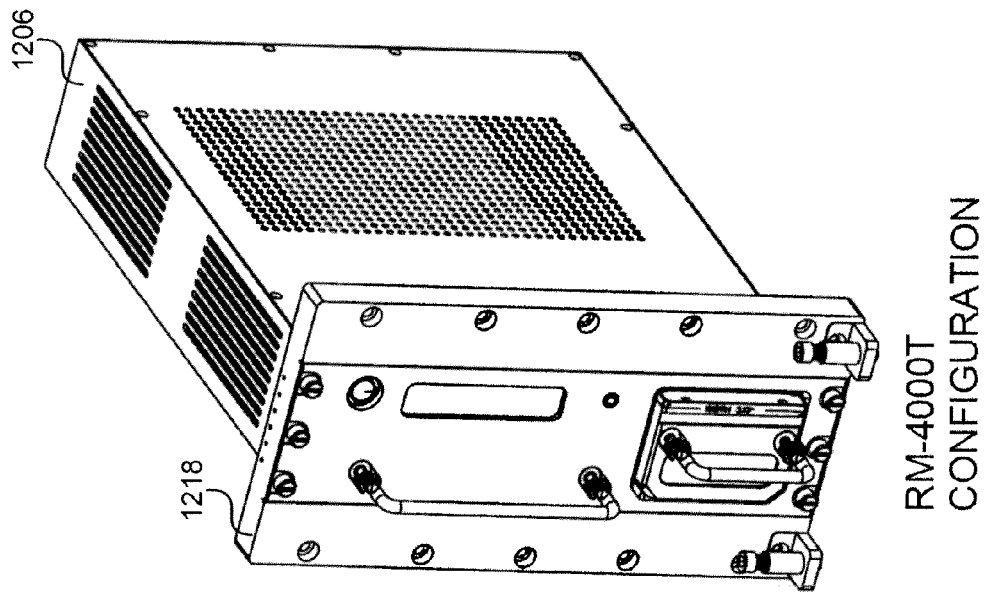
Figure 12B:
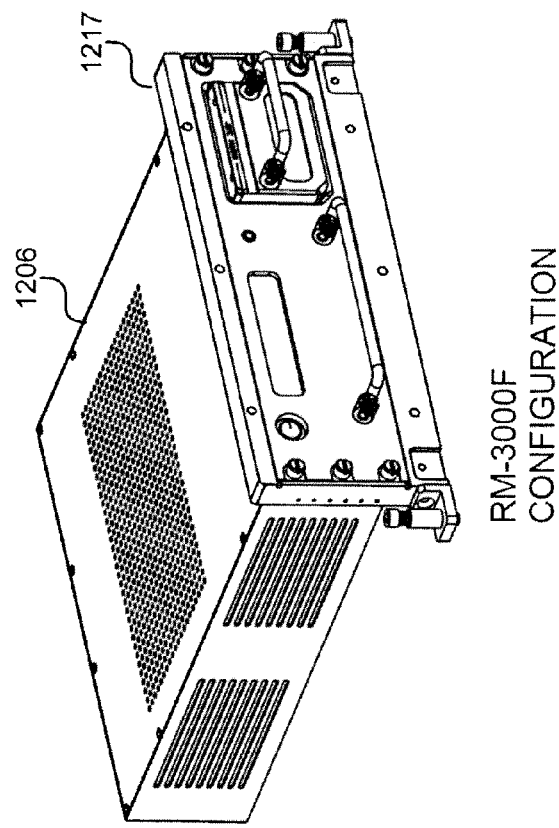
Figure 12D:
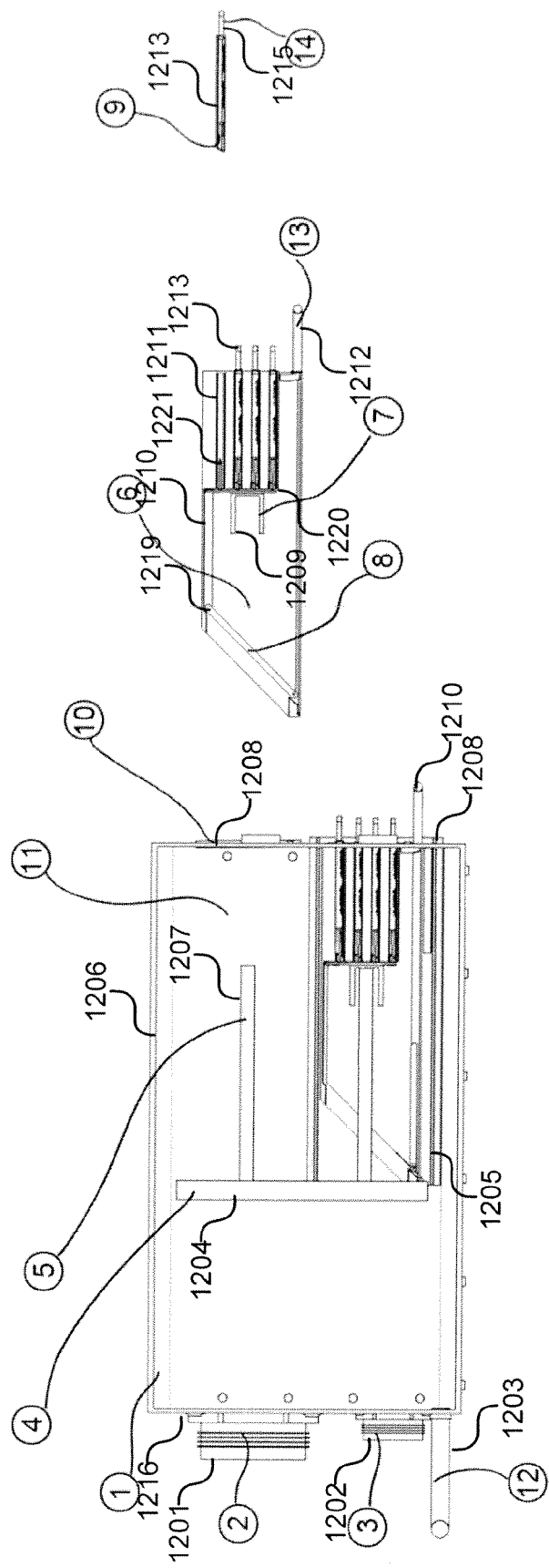
Figure 12E:
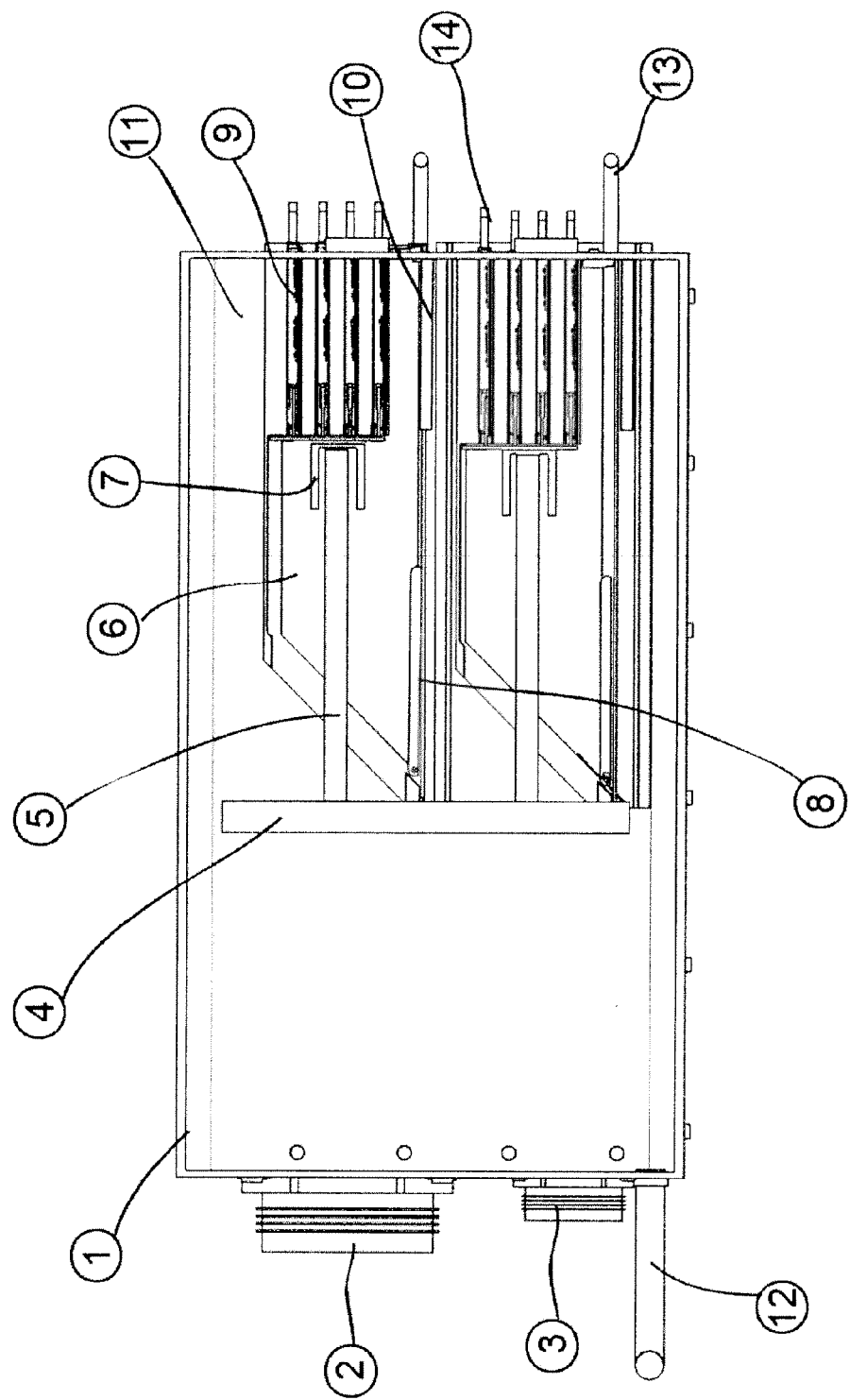
Figure 12F:
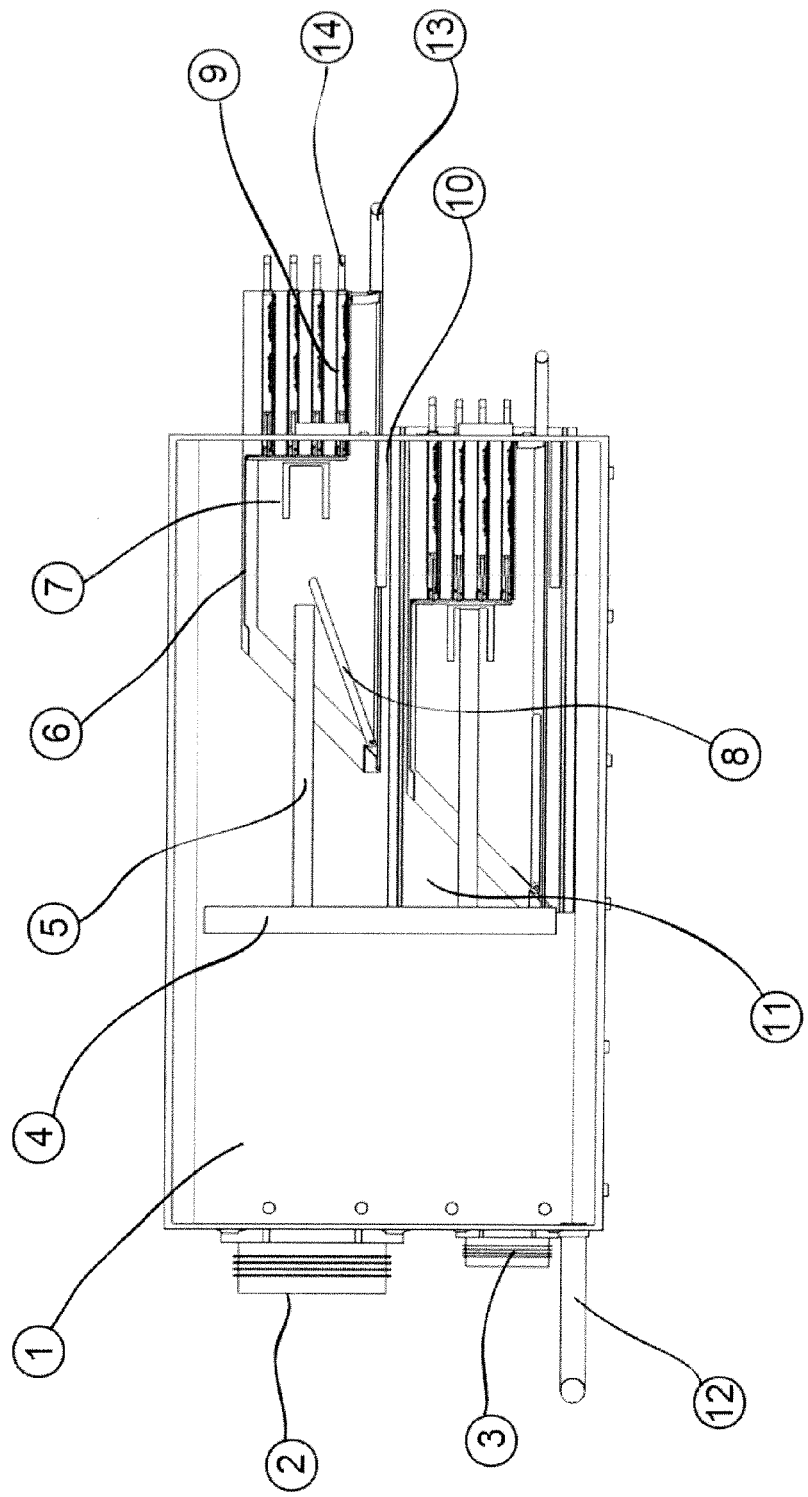
Figure 12G:
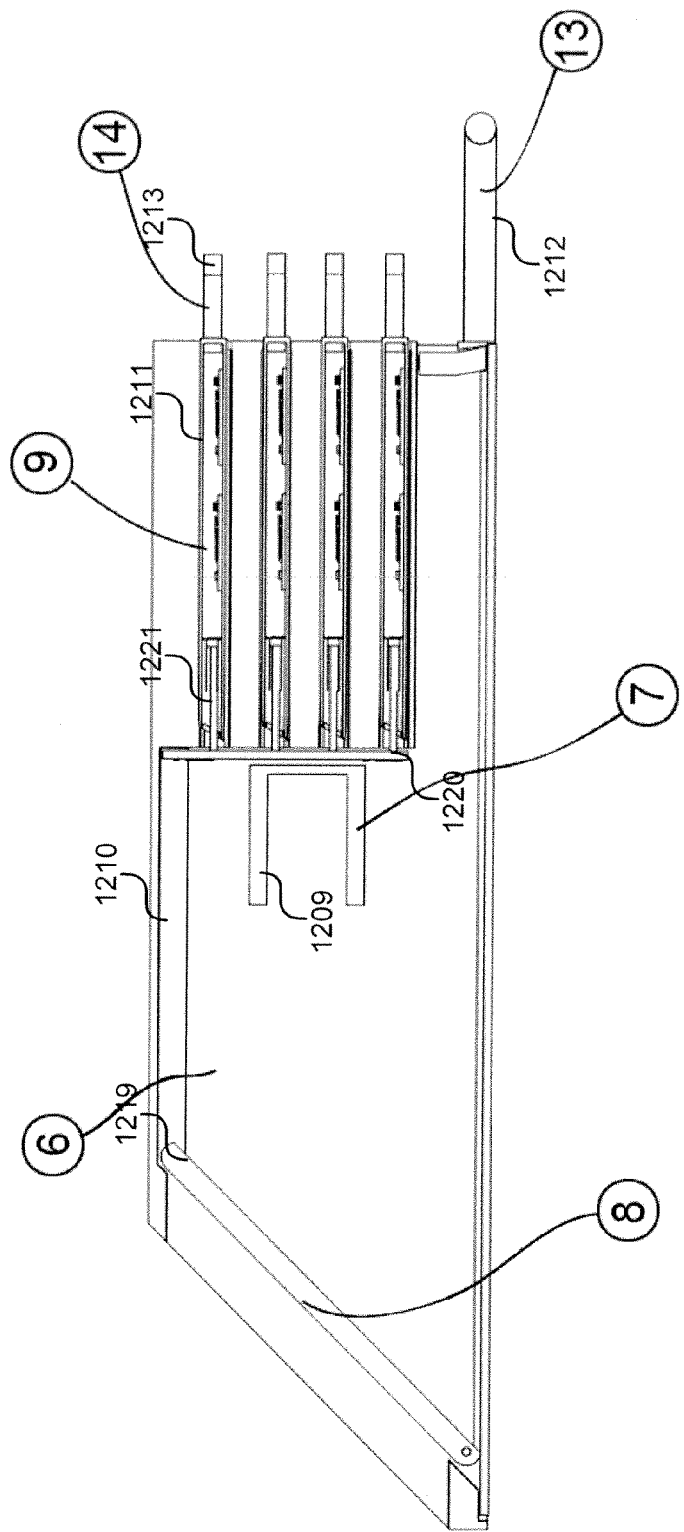
Figure 12H:
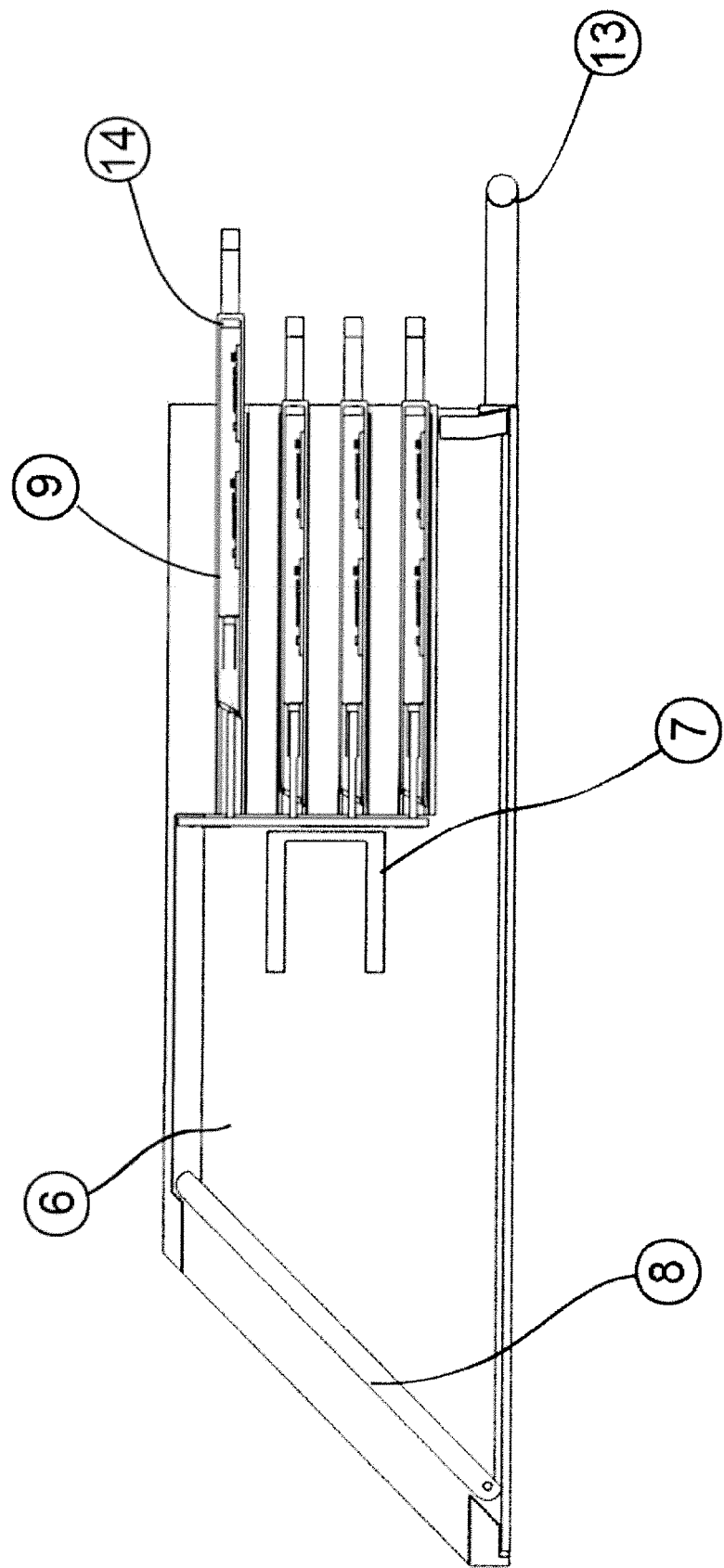
Figure 12I:
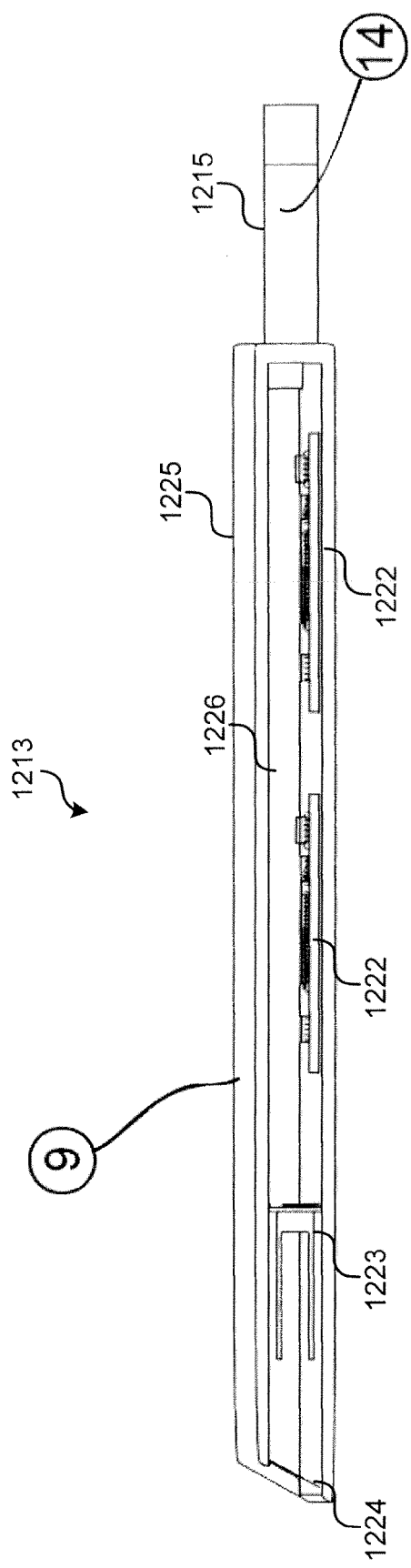

As illustrated in FIG. 12D, in some embodiment the chassis may comprise one or more bays 1208. In some such embodiments, a first set of bays is reserved for RED data and a second set of bays is reserved for BLACK data. In some embodiments, the electronics system 1204 manages the segregation of RED and BLACK data. In other embodiments, RED and BLACK segregation occurs outside of the recorder 1206. In such embodiments, the data connector 1201 may include separate connectors for RED data and BLACK data. Additionally, the electronics system 1204 may comprise a first subsystem for RED data and a second subsystem for BLACK data. The two subsystems may be communicatively isolated, to ensure that no RED data can cross to the BLACK subsystem or vice versa.

In other embodiments, the chassis comprises only a single bay 1208. In some such embodiments, RED/BLACK separation is still provided. In some embodiments, the mother cartridge comprises two connectors 1209, one for RED data and another for BLACK data. In such embodiments, the daughter cartridge electronic system 1220 includes a first subsystem coupled to the first connector 1209 having a first RAID controller for a BLACK logical drive and a second subsystem coupled to the second connector 1209 having a second RAID controller for a RED logical drive. As in embodiments having at least two drives 1208, segregation of RED and BLACK data may occur in the chassis 1206 or prior to the presentation of data to the chassis. In some such embodiments, certain receptacles 1211 are reserved for RED data and other receptacles 1211 are reserved for BLACK data.

In some embodiments, the connectors 1221 in different receptacles 1211 support different data interfaces. For example, after a mission, different data may need to be analyzed by different parties. These parties may use different data interfaces for data review, such as SAS, SCSI, FC, ATA, or other interfaces. Embodiments of the invention may preferentially store different data for different parties on the different drives. Accordingly, after a mission, the drives may be disseminated directly to the parties who need them.

A particular embodiment is a conduction cooled system with the following basic features that can be modified according to application: 3u/6u form factors; air/conduction cooled; 4 channel of Gigabit Ethernet data recorder at 500 MB/s; removable/scalable solid state storage of 1 TB to 5 TB per memory module; typical environmental: 1500 g shock tested, MIL-STD-810G, etc.; encryption to NSA Type 1 as an option when required.

Further embodiments may include zeroization systems in the mother electronics 1220, the daughter electronics 1222, the chassis electronics 1204, or a combination thereof. The zeroization may be pyrotechnics embedded into the circuitry, or conventional electronic zeroization. For example, in order to provide pyrotechnic (or, chemical) ignition, we need about 250 mA during 1 sec, assuming 6V-voltage, or (250) (6) (1)=1500 mW-sec=1.5 W-sec of electric energy (D.C.), only. In some embodiments, the zeroization system includes a supercapacitor (SC) storing the required energy. Typical SC energy density is 6 Wh/kg, or 21.6 Wsec/g. Thus, 1.5 Wsec requires only a small SC for sufficient energy storage. Other embodiment employ batteries, such as lithium polymer (Li—Po) batteries. In the case of Li—Po rechargeable battery, with 100 Wh/kg of energy density, this is even less required in terms of battery weight needed to storage such required ignition energy for zeroization purposes.

Figure 13:
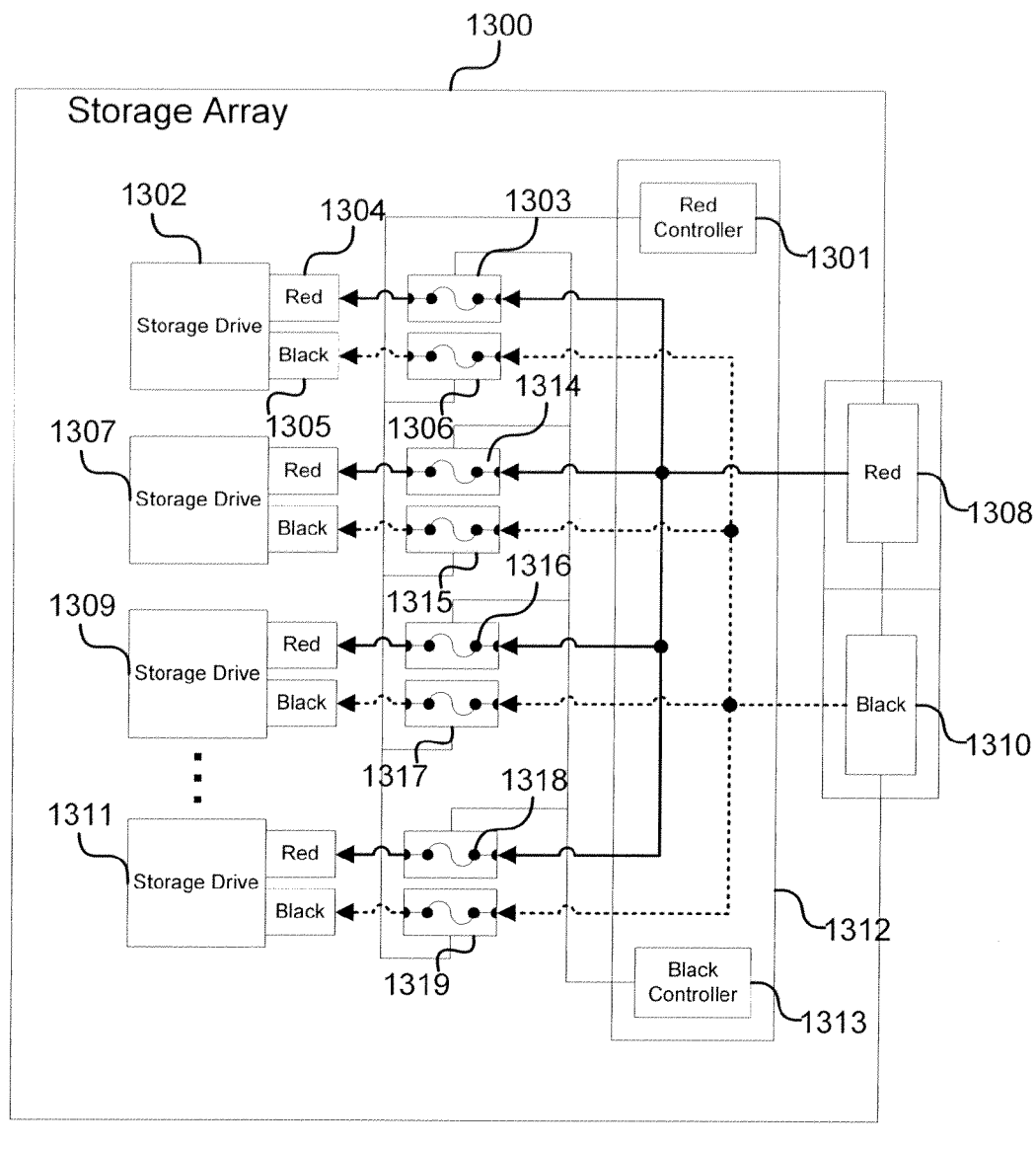
FIG. 13 illustrates an embodiment of the invention that provides RED/BLACK data separation with expandable logical drives

FIG. 13 illustrates an embodiment of the invention that provides RED/BLACK data separation with expandable logical drives. In this embodiment, a storage array 1300 comprises a plurality of storage drives 1302, 1307, 1309, 1311, and a controller system 1312. In some embodiments, the storage array 1300 may be a mother cartridge and the storage drives 1302, 1307, 1309, 1311 are daughter cartridges. In other embodiments, the array 1300 may comprise any array of memory devices 1302, 1307, 1309, 1311, such as solid state drives, hard disk drives, or hybrid combinations thereof. The storage array 1300 comprises two connectors 1308 and 1310. One connector 1308 is reserved for one type of data, such as RED data or classified data. The other connector 1310 is reserved for another type of data, such as BLACK data or unclassified data. The controller system 1312 controls where data of each type of data is routed.

In the illustrated embodiment, the controllers 1312 comprises a first disk array controller 1301 and a second disk array controller 1313. In some embodiments, the disk array controllers 1301 and 1313 comprise RAID controllers. Both disk array controllers 1301 and 1313 are coupled to each storage drive 1302, 1307, 1309, 1311, and are capable of building a logical storage unit out of the drives. The first disk array controller 1301 controllers where data received from the first array connector 1308 is stored. The second disk array controller 1313 controls where data from the second array connector 1313 is stored. In some embodiments, the first array controller 1301 controls a sub-array of the drives 1302, 1307, 1309, 1311 to present a logical unit for storing RED data and the second array controller 1313 controls a sub-array of the drives 1302, 1307, 1309, 1311 to present a logical unit for storing BLACK data.

The storage array 1300 has a data path between each connector 1308 and each storage drive 1302, 1307, 1309, 1311. The storage drives 1302, 1307, 1309, 1311 each comprise a first storage connector 1304 coupled to the first array connector 1308 and a second storage connector 1305 coupled to the second array connector 1310. Interposed between each storage drive 1302, 1307, 1309, 1311 and each connector 1308 and 1310 is a fuse 1303, 1306, 1314, 1315, 1316, 1317, 1318, 1319. The fuses of the data path from the second array connector 1310 are controlled by the first controller 1301, and the fuses of the data path from the first array connector 1308 are controlled by the second controller 1313. Each controller 1301 and 1313 is configured to allocate one or more of the drives 1302, 1307, 1309, 1311 into a sub-array that it controls and presents as a logical storage unit. When a storage drive 1302, 1307, 1309, 1311 is allocated to a controller 1301, 1313, the controller 1301, 1313 trips the fuse coupling the storage drive to the other connector. For example, if the first controller incorporates storage drive 1307 into its logical unit, then it will trip the fuse 1315, preventing the second controller 131 from accessing storage drive 1307. Likewise, if the second controller 131 incorporates storage drive 1311 into its logical unit, it will trip fuse 1318, preventing the first controller 1301 from accessing the drive. In some embodiments, once tripped, the fuses 1303, 1306, 1314, 1315, 1316, 1317, 1318, 1319 can only be reset physically.

Accordingly, in these embodiments, once a drive is allocated to one logical unit or the other, it is prevented from being reconfigured electronically until after the mission is complete. In particular, the illustrated embodiment provides separate data paths and controllers for RED and BLACK data. Additionally, the illustrated embodiment prevents RED data from being stored in a BLACK allocated drive, and vice versa, even in the case of adversarial attack. Further, the separate storage of RED and BLACK, or classified and unclassified data, avoids the need for "system high" protection. Accordingly, unclassified or BLACK data may be rapidly distributed to flight crews or other parties needing rapid access to the data without the need for time-consuming removal of classified or RED data.

In some embodiments, the respective sizes of the logical units presented by the first controller 1301 and the second controller 1313 may be determined before the storage operations. For example, a first set of drives may be allocated to the first controller 1031 and a second set of drives may be allocated to the second controller 1313 before the mission. In other embodiments, some or all of the drives 1302, 1307, 1309, 1311 are not pre-allocated, and the controllers 1301 and 1313 may incorporate drives into their logical units as needed. In particular, this may be useful in situations where the amount of RED data and BLACK data is not known before the mission.

Figure 14:
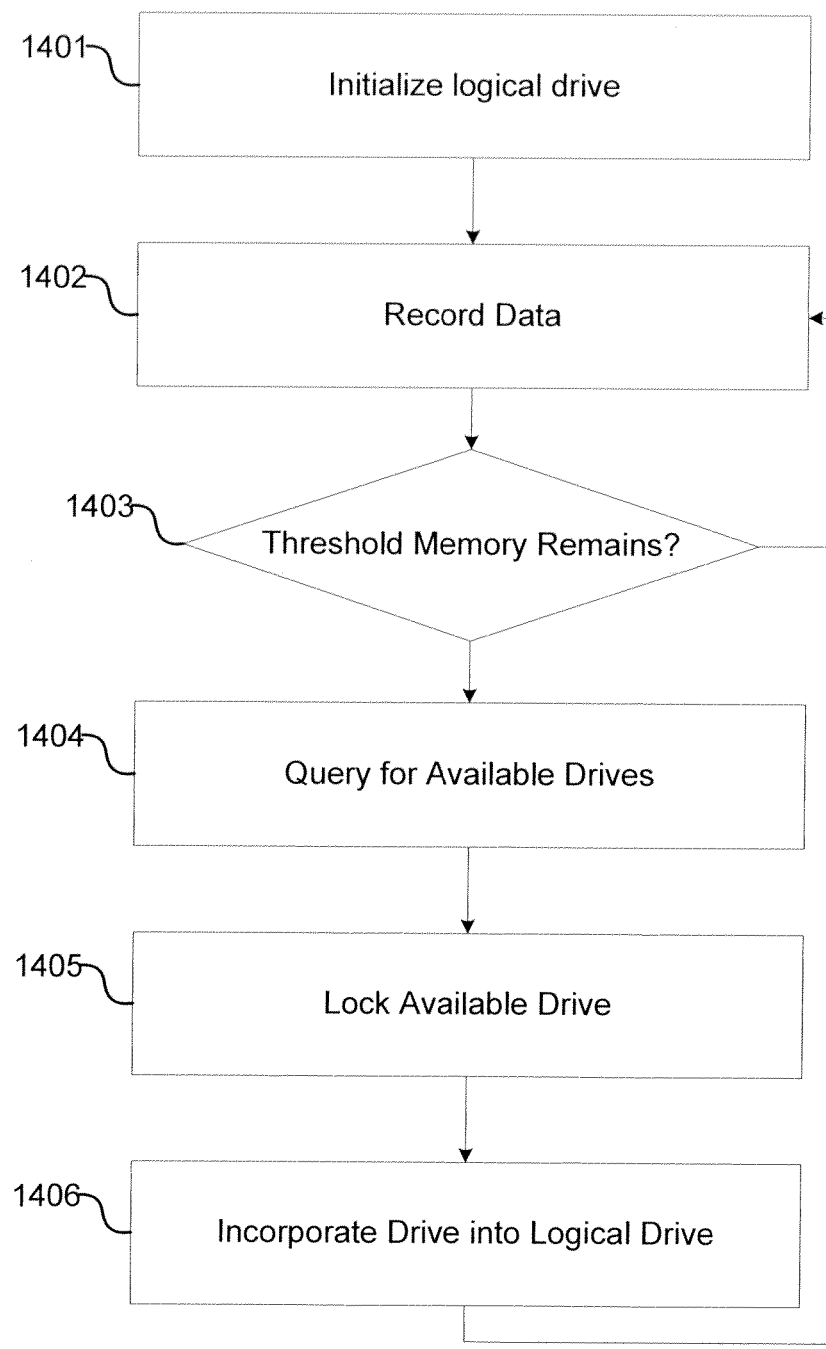
FIG. 14 illustrates a method of expanding a logical drive during mission operation implemented in accordance with an embodiment of the invention.

FIG. 14 illustrates a method of expanding a logical drive during mission operation implemented in accordance with an embodiment of the invention. In step 1401, each logical drive is initialized. For example, each controller may be allocated a first drive from a set of available drives. Each controller then performs steps 1402 and 1403 to record data to the allocated drives for as long as at least a threshold amount of memory remains. If the threshold is exceeded, then the controller is low on memory and performs step 1404 to query for another available drive. If a drive is available 1405, then the controller trips the fuse for the other memory path, locking the drive out from the other controller. Then the drive is incorporated into the controller's logical unit 1406, and the controller continues recording data 1402.

Figure 15:
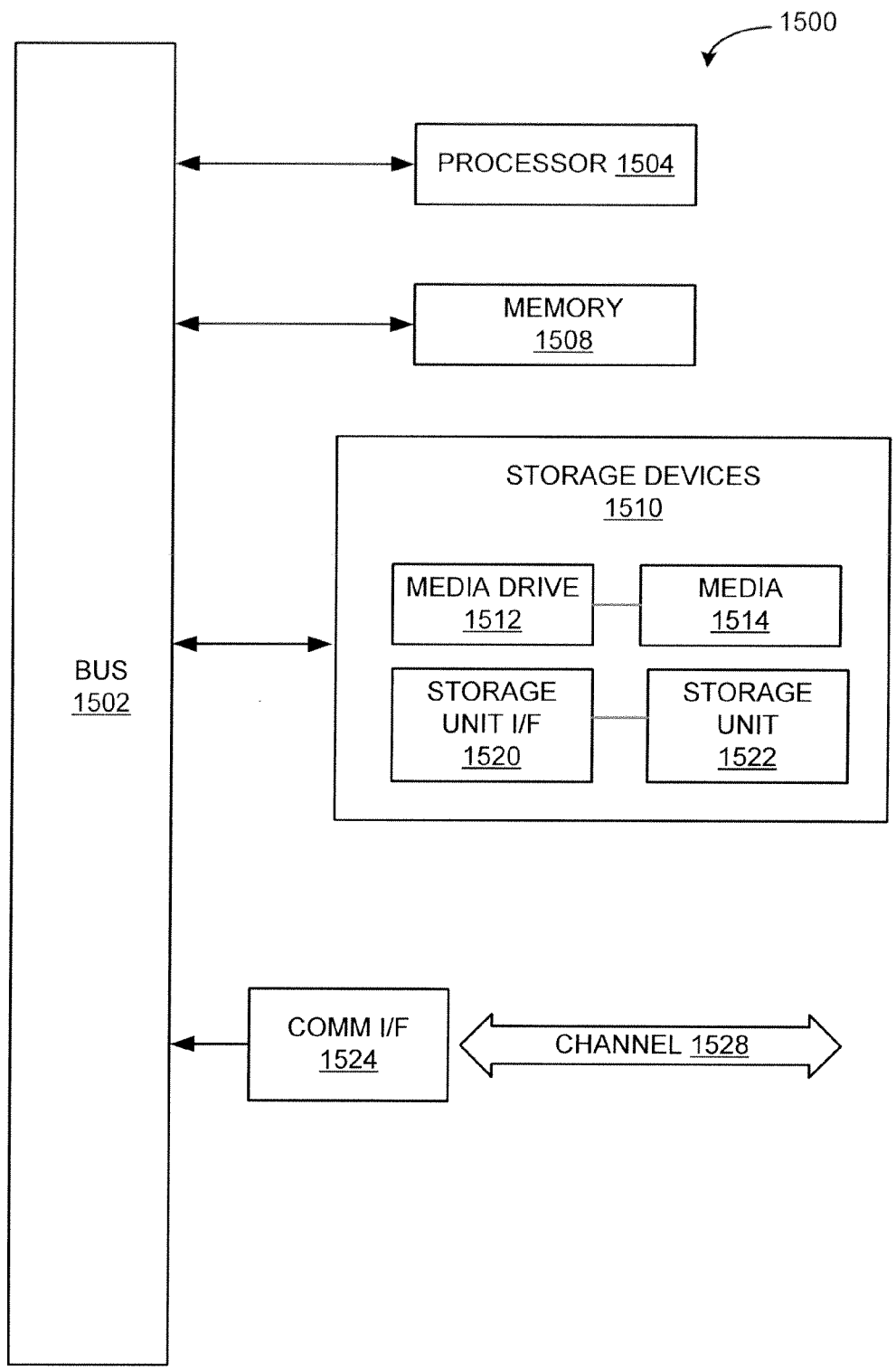
FIG. 15 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example computing module 1500. After reading this description, it will become apparent to a person skilled in the relevant art how to implement the invention using other computing modules or architectures.

Referring now to FIG. 15, computing module 1500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1500 might include, for example, one or more processors, controllers, control modules, or other processing devices, such as a processor 1504. Processor 1504 might be implemented using a general-purpose or special-purpose processing engine such as, for example, a microprocessor, controller, or other control logic. In the illustrated example, processor 1504 is connected to a bus 1502, although any communication medium can be used to facilitate interaction with other components of computing module 1500 or to communicate externally.

Computing module 1500 might also include one or more memory modules, simply referred to herein as main memory 1508. For example, preferably random access memory (RAM) or other dynamic memory, might be used for storing information and instructions to be executed by processor 1504. Main memory 1508 might also be used for storing temporary variables or other intermediate information during execution of instructions to be executed by processor 1504. Computing module 1500 might likewise include a read only memory ("ROM") or other static storage device coupled to bus 1502 for storing static information and instructions for processor 1504.

The computing module 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a floppy disk drive, a magnetic tape drive, an optical disk drive, a CD or DVD drive (R or RW), or other removable or fixed media drive might be provided. Accordingly, storage media 1514 might include, for example, a hard disk, a floppy disk, magnetic tape, cartridge, optical disk, a CD or DVD, or other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing module 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory module) and memory slot, a PCMCIA slot and card, and other fixed or removable storage units 1522 and interfaces 1520 that allow software and data to be transferred from the storage unit 1522 to computing module 1500.

Computing module 1500 might also include a communications interface 1524. Communications interface 1524 might be used to allow software and data to be transferred between computing module 1500 and external devices. Examples of communications interface 1524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1524 might typically be carried on signals, which can be electronic, electromagnetic (which includes optical) or other signals capable of being exchanged by a given communications interface 1524. These signals might be provided to communications interface 1524 via a channel 1528. This channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1508, storage unit 1520, media 1514, and channel 1528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A memory recorder, comprising:
    a memory recorder housing comprising:
        a receptacle for a removable memory unit;
        a system controller;
        a bus interface coupled to the system controller; and
        a first memory interface coupled to the system controller; and
    a removable memory unit comprising:
        a plurality of memory storage devices;
        a memory controller coupled to the plurality of memory storage devices and comprising a first disk array controller and a second disk array controller;
        a second memory interface coupled to the memory controller and configured to provide a connection to the system controller when the removable memory unit is installed in the receptacle; and
        a third memory interface;
    wherein a memory storage device of the plurality of the memory storage devices is coupled to the second memory interface along a first data path and to the third memory interface along a second data path; a first fuse is interposed between the memory storage device and the second memory interface; and a second fuse is interposed between the memory storage device and the third memory interface.

2. The memory recorder of claim 1, further comprising an adapter detachably coupled to the memory recorder housing to couple to a predetermined avionics bay.

3. The memory recorder of claim 1, further comprising an Ethernet port coupled to the memory controller and externally accessible from the removable memory unit without removing the removable memory unit from the memory recorder housing.

4. The memory recorder of claim 1, wherein the memory recorder housing comprises an I/O port and the system controller is configured to perform signal rerouting to address a predetermined pin-out configuration of an avionics system.

5. The memory recorder of claim 4, wherein the I/O port is removable.

6. The memory recorder of claim 4, wherein the system controller is configured to perform signal translation of signals outgoing to or incoming from the I/O port.

7. The memory recorder of claim 4, wherein the system controller comprises:
   a plurality of transcoder integrated circuits (ICs) configured to transcode signals of a first class of data types;
   a field-programmable gate array (FPGA) configured to implement a plurality of FPGA behavioral codes to hardware transcode signals of a second class of data types; and
   a microprocessor configured to implement a plurality of software codecs to software transcode signals of a third class of data types.

8. The memory recorder of claim 7, wherein the system controller further comprises a matrix switch interposed between the I/O port and the transcoder ICs, FPGA, and microprocessor and configured to control which of the transcoder ICs, FPGA, or microprocessor is connected to the I/O port.

9. The memory recorder of claim 8, wherein, during a set-up procedure, the system controller is configured to control the matrix switch to route signals to a transcoder IC of the plurality of transcoder ICs if a supported transcoder IC is available, then to the microprocessor if a supported software codec is available, then to the FPGA.

10. The memory recorder of claim 9, wherein the system controller stores a configuration file of the results of the set-up procedure, the configuration file containing information that indicates switch routing information, FPGA behavior codes if the matrix switch is routed to the FPGA, and the supported software codec if the matrix switch is routed to the microprocessor.

11. The memory recorder of claim 9, wherein the matrix switch is coupled to a transceiver and is configured to route data to a second data path in response to receiving a data rerouting signal.

12. The memory recorder of claim 1, wherein the memory controller comprises a RAID controller for the plurality of memory storage devices.

13. The memory recorder of claim 12, wherein a storage device of the plurality of storage devices is removable.

14. The memory recorder of claim 13, wherein the removable storage device is externally accessible from the removable memory unit without removing the removable memory unit from the memory recorder.

15. The memory recorder of claim 1, wherein:
   the first disk array controller is coupled to control the storage of data on the first data path and to control the second fuse; and
   the second disk array controller is coupled to control the storage of data on the second data path and to control the first fuse.

16. The memory recorder of claim 1, wherein the memory controller comprises a memory storing a built-in-test program executable by the memory controller in response to a signal provided by the system controller.

17. In a removable memory unit comprising a plurality of memory storage devices, a method of data storage, the method comprising:
   receiving a plurality of data streams from a platform data interface;
   a first controller of a plurality of controllers allocating a first storage device into a first sub-array of storage devices, wherein the first storage device is coupled to a first data interface via a first fuse and to a second data interface via a second fuse;
   the first controller tripping the second fuse preventing any of the other of the plurality of controllers accessing the allocated storage device; and
   routing a first stream of the plurality of data streams to the allocated storage device.

18. The method of claim 17, further comprising;
   a second controller of the plurality of controllers allocating a second storage device into a second sub-array of storage devices, wherein the second storage device is coupled to a third data interface via a third fuse and to a fourth data interface via a fourth fuse; and
   the second controller tripping the fourth fuse preventing any of the other of the plurality of controllers accessing the allocated storage device.

* * * * *